United States Patent
Ren

(10) Patent No.: US 10,664,205 B2
(45) Date of Patent: May 26, 2020

(54) IMAGE PROCESSING APPARATUS TRANSMITTING REGISTRATION REQUEST INCLUDING INCAPABILITY INFORMATION INDICATING THAT ANY SETTING IS INCAPABLE OF BEING DESIGNATED

(71) Applicant: BROTHER KOGYO KABUSHIKI KAISHA, Nagoya, Aichi (JP)

(72) Inventor: Yongyong Ren, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/414,057

(22) Filed: May 16, 2019

(65) Prior Publication Data
US 2019/0361636 A1 Nov. 28, 2019

(30) Foreign Application Priority Data
May 23, 2018 (JP) .................................. 2018-098806

(51) Int. Cl.
G06F 3/12 (2006.01)

(52) U.S. Cl.
CPC .......... *G06F 3/1205* (2013.01); *G06F 3/1255* (2013.01); *G06F 3/1287* (2013.01); *G06F 3/1288* (2013.01)

(58) Field of Classification Search
CPC .... G06F 3/1205; G06F 3/1255; G06F 3/1287; G06F 3/1288; H04N 21/4147; H04N 21/4223
See application file for complete search history.

(56) References Cited

U.S. PATENT DOCUMENTS

| | | | |
|---|---|---|---|
| 2012/0117629 A1* | 5/2012 | Miyazawa | H04L 63/08 726/4 |
| 2014/0071476 A1 | 3/2014 | Aritomi | |
| 2015/0095463 A1* | 4/2015 | Saito | H04L 63/0807 709/219 |

FOREIGN PATENT DOCUMENTS

| | | |
|---|---|---|
| JP | 2012-190337 A | 10/2012 |
| JP | 2014-056320 A | 3/2014 |

* cited by examiner

*Primary Examiner* — Neil R McLean
(74) *Attorney, Agent, or Firm* — Scully, Scott, Murphy & Presser, PC

(57) ABSTRACT

In an image processing apparatus, a processor transmits to the server a first registration request including incapability information. The incapability information indicates that any of a plurality of settings for an image process is incapable of being designated. The processor receives from the server a first function execution instruction including the account information, and first relation information which is related to a fact that no setting for the image process is specified. The processor acquires from a memory setting specification information correlated with the account information. The processor displays a specification screen for prompting a user to specify one setting from among one or more settings for the image process specified by the acquired setting specification information. In a case where the user specifies a first setting via the specification screen, the processor controls an image processing execution unit to execute the image process in accordance with the first setting.

11 Claims, 14 Drawing Sheets

(SERVER PRINTING PROCESS: CASE B)

IMAGE PROCESSING APPARATUS TRANSMITTING REGISTRATION REQUEST INCLUDING INCAPABILITY INFORMATION INDICATING THAT ANY SETTING IS INCAPABLE OF BEING DESIGNATED

CROSS REFERENCE TO RELATED APPLICATION

This application claims priority from Japanese Patent Application No. 2018-098806 filed May 23, 2018. The entire content of the priority application is incorporated herein by reference.

TECHNICAL FIELD

The present disclosure is related to a technique in which an image processing apparatus performs an image process by using a server.

BACKGROUND

A conventional printer transmits to a storage management server login information, the printer name for the printer, and capability information in order to store this information on the server. The capability information specifies all printing conditions that the printer is capable of implementing. When a personal computer logs in to the storage management server, the server transmits data representing a print settings screen to the personal computer in order that the user of the personal computer can select desired printing conditions to be used for a printing operation from among the printing conditions specified in the capability information. Subsequently, the storage management server receives print data and condition data specifying the printing conditions selected in the print settings screen from the personal computer and transmits this information to the printer, directing the printer to execute a printing operation.

SUMMARY

However, in some cases certain users of the printer may only be allowed to select some of the printing conditions that the printer can execute (such as monochrome printing from among monochrome printing and color printing), for example. In the conventional technology described above, capability information representing all printing conditions that the printer can execute is transmitted to the storage management server, and a print settings screen based on this capability information is displayed on the personal computer. Consequently, the user can select printing conditions not permitted to the user by using the print settings screen, enabling the printer to execute a printing operation based on those printing conditions.

In view of the foregoing, it is an object of the present disclosure to provide a technique, to be used in a system that controls an image processing apparatus to execute image processes via a server, for suppressing the image processing apparatus from executing an image process conforming to image process settings that the user is not allowed to use.

In order to attain the above and other objects, the disclosure provides an image processing apparatus. The image processing apparatus includes a display, an image processing execution unit; and a processor. The processor is configured to perform: receiving a registration instruction for registering information on the image processing apparatus to an external server; in response to receiving the registration instruction, transmitting to the external server a first registration request including incapability information, the incapability information indicating that any of a plurality of settings for an image process is incapable of being designated, the first registration request triggering the external server to register the incapability information and account information for a specific user of the image processing apparatus so that the incapability information and the account information are correlated with each other, wherein in a case where the external server receives the account information from a terminal device after the external server registers the incapability information and the account information, the external server transmits to the terminal device first selection screen data, the first selection screen data being generated on the basis of the incapability information correlated with the account information so that the first selection screen data represents a first selection screen including an operation specification area and excluding a setting specification area, the operation specification area being for receiving from a user of the terminal device a specification operation to instruct the image processing apparatus to perform the image process, the setting specification area being for receiving from the user of the terminal device an operation to set a setting for the image process; after the operation specification area in the first selection screen is specified in the terminal device and the terminal device transmits to the external server a first function execution request excluding a setting for image process, receiving from the external server a first function execution instruction including the account information, and first relation information which is related to a fact that no setting for the image process is specified; acquiring, from a memory, setting specification information correlated with the account information, wherein the memory is configured to store, for each of one or more users including the specific user, account information and the setting specification information so that the account information and the setting specification information is correlated with each other, each setting specification information being for specifying one or more settings for the image process that the corresponding user is permitted to use; displaying on the display a specification screen for prompting the specific user to specify one setting from among one or more settings for the image process specified by the acquired setting specification information; and in a case where the specific user specifies a first setting for the image process via the specification screen, controlling the image processing execution unit to execute the image process in accordance with the first setting.

According to another aspect, the disclosure provides a non-transitory computer readable storage medium storing a set of program instructions for an image processing apparatus including a display and an image processing execution unit. The set of program instructions includes: receiving a registration instruction for registering information on the image processing apparatus to an external server; in response to receiving the registration instruction, transmitting to the external server a first registration request including incapability information, the incapability information indicating that any of a plurality of settings for an image process is incapable of being designated, the first registration request triggering the external server to register the incapability information and account information for a specific user of the image processing apparatus so that the incapability information and the account information are correlated with each other, wherein in a case where the external server receives the account information from a terminal device after the external server registers the incapability information and the account information, the external server transmits to the terminal device first selection screen data, the first selection screen data being generated on the basis of the incapability information correlated with the account information so that the first selection screen data represents a first selection screen including an operation specification area and excluding a setting specification area, the operation specification area being for receiving from a user of the terminal device a specification operation to instruct the image processing apparatus to perform the image process, the setting specification area being for receiving from the user of the terminal device an operation to set a setting for the image process; after the operation specification area in the first selection screen is specified in the terminal device and the terminal device transmits to the external server a first function execution request excluding a setting for image process, receiving from the external server a first function execution instruction including the account information, and first relation information which is related to a fact that no setting for the image process is specified; acquiring, from a memory, setting specification information correlated with the account information, wherein the memory is configured to store, for each of one or more users including the specific user, account information and the setting specification information so that the account information and the setting specification information is correlated with each other, each setting specification information being for specifying one or more settings for the image process that the corresponding user is permitted to use; displaying on the display a specification screen for prompting the specific user to specify one setting from among one or more settings for the image process specified by the acquired setting specification information; and in a case where the specific user specifies a first setting for the image process via the specification screen, controlling the image processing execution unit to execute the image process in accordance with the first setting.

BRIEF DESCRIPTION OF THE DRAWINGS

The particular features and advantages of the disclosure as well as other objects will become apparent from the following description taken in connection with the accompanying drawings, in which.

DETAILED DESCRIPTION

First Embodiment

Structure of a Communication System 2

Figure 1:
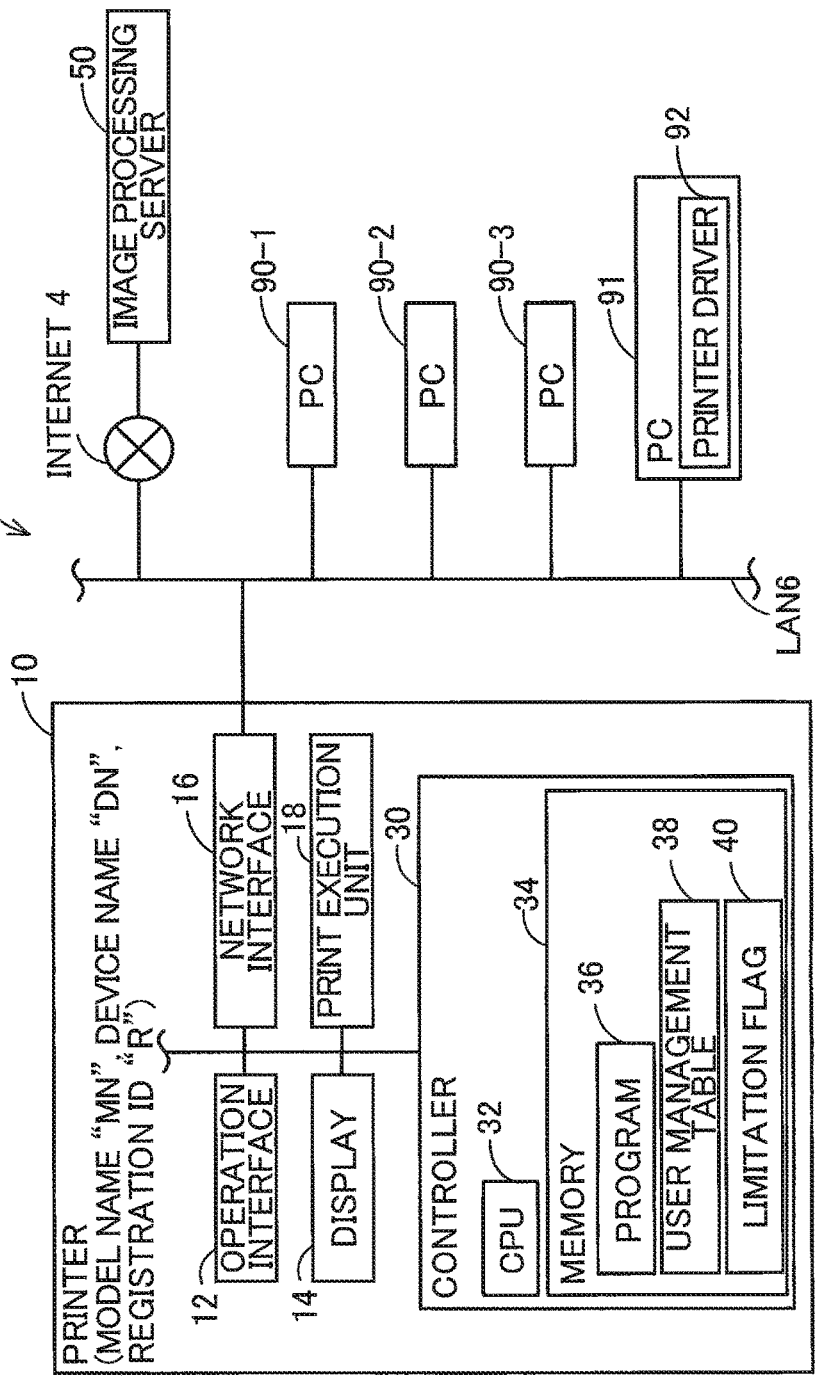
FIG. 1 is an explanatory diagram illustrating a structure of a communication system and a user management table according to a first embodiment.

Next, the structure of a communication system 2 will be described with reference to FIG. 1. The communication system 2 is provided with a printer 10, an image processing server 50, and a plurality of personal computers (PCs) 90-1, 90-2, 90-3, and 91. In the following description, the image processing server 50 will be simply called the "server 50." The printer 10 and the PCs 90-1 and the like are connected to the same local area network (LAN) 6 and are further connected to Internet 4 via the LAN 6. The server 50 is connected to the internet 4. Accordingly, the printer 10 and the PCs 90-1 and the like can communicate with the server 50 via the Internet 4.

Structure of the Printer 10

The printer 10 is a peripheral device that can execute printing operations (i.e., a device peripheral to the PCs 90-1 and the like). The printer 10 has a model name MN, a device name DN, and a registration ID "R". The registration ID "R" is preset on the printer 10 for identifying the printer 10, and to be registered on the server 50. The printer 10 is provided with an operation interface 12, a display 14, a network interface 16, a print execution unit 18, and a controller 30. All components 12-30 are connected to a bus line (not provided with a reference numeral).

The operation interface 12 is provided with a plurality of keys. By operating the operation interface 12, the user can input various instructions into the printer 10. The display 14 functions to display various information. The network interface 16 is connected to the LAN 6. The print execution unit 18 is provided with a printing mechanism employing an inkjet or laser system, for example.

The controller 30 is provided with a CPU 32, and a memory 34. The CPU 32 executes various processes according to a program 36 stored in the memory 34. The memory 34 is configured of volatile memory, nonvolatile memory, and the like. The memory 34 also stores a user management table 38, and a limitation flag 40.

The user management table 38 correlates login status information, a username, a password, account information, and limitation information for each of one or more users that use the printer 10. In the following description, the user management table 38 will simply be referred to as the "table 38." The username and the password are information identifying a user and are used by the user to log in to the printer 10. The account information is information that the user uses to log in to the server 50. The administrator of the printer 10 stores a username, a password, and account information in the table 38 for each user, for example. The login status information has one of the values "logged in" and "logged out." "Logged in" indicates that the user is currently logged in to the printer 10, while "logged out" indicates that the user is not currently logged in to the printer 10.

The limitation information specifies one or more print settings available to the corresponding user from among a plurality of print settings that the printer 10 can use when executing printing operations. In the embodiment, there are two settings, "color" and "monochrome," for the color setting, and two settings, "simplex" and "duplex," for the printing-sides setting, making a total of four print setting combinations. The "color" setting indicates that the user is permitted to print in color, while the "monochrome" setting indicates that the user is permitted to only print in monochrome. The "simplex" setting indicates that the user is permitted to perform simplex printing to print images on one side of the printing medium, while the "duplex" setting indicates that the user is permitted to print on both sides of the printing medium.

According to the limiting information shown in FIG. 1, the user identified by a username UN1 and a password P1 (hereinafter called the "first user") is allowed to use all four print setting combinations configured from the two color settings "color" and "monochrome" and the two printing-sides settings "simplex" and "duplex." The user identified by a username UN2 and a password P2 (hereinafter called the "second user") is allowed to use two print setting combinations configured from the single color setting "monochrome" and both printing-sides settings "simplex" and "duplex." The user identified by a username UN3 and a password P3 (hereinafter called the "third user") is allowed to use only one print setting combination configured of the color setting "monochrome" and the printing-sides setting "duplex." Note that the limitation information may include other settings in addition to color settings and printing-sides setting, such as settings for sizes of printing paper and numbers of sheets.

The limitation flag 40 is set to one of the values "ON" and "OFF." The "ON" setting indicates that the user is limited in using print settings according to the limitation information in the table 38. In other words, when the limitation flag 40 is set to "ON", the user is permitted to use settings indicated by the limitation information. The "OFF" setting indicates that the user is not limited in using print settings, and the user can set any settings settable for the printer 10.

Structure of the Image Processing Server 50

The server 50 is a Google Cloud Print (GCP) server provided by Google (registered trademark), for example, that is connected to the Internet. As a variation, the server 50 may be a server provided by the vendor of the printer 10, for example. The server 50 functions to mediate printing operations between the printer 10 and each of the PCs 90-1 and the like. That is, the server 50 converts an image file submitted by the PC 90-1, for example, generates print data in a format that the printer 10 can interpret, and transmits this print data to the printer 10. Accordingly, the PC 90-1 can allow the printer 10 to execute printing operations by submitting an image file to the server 50 and need not be provided with a printer driver for converting image files to print data. The users of the printer 10 preregisters their account information (information for a Google account, for example) on the server 50.

Structure of the PCs 90-1, 90-2, 90-3, and 91

The PCs 90-1, 90-2, and 90-3 are not provided with a printer driver for executing printing operations on the printer 10. The PC 91 is provided with a printer driver 92 for executing printing operations on the printer 10. Each of the PCs 90-1, 90-2, 90-3 and 91 is provided with a web browser (not shown), such as Google Chrome (registered trademark). In the embodiment, the PCs 90-1 and the like are stationary terminal devices (desktop computers, for example). However, as a variation the PCs 90-1 and the like may be configured of portable terminal devices such as mobile telephones (smartphones, for example), personal digital assistants (PDAs), notebook computers, or tablet computers.

Normal Printing Process

Figure 2:
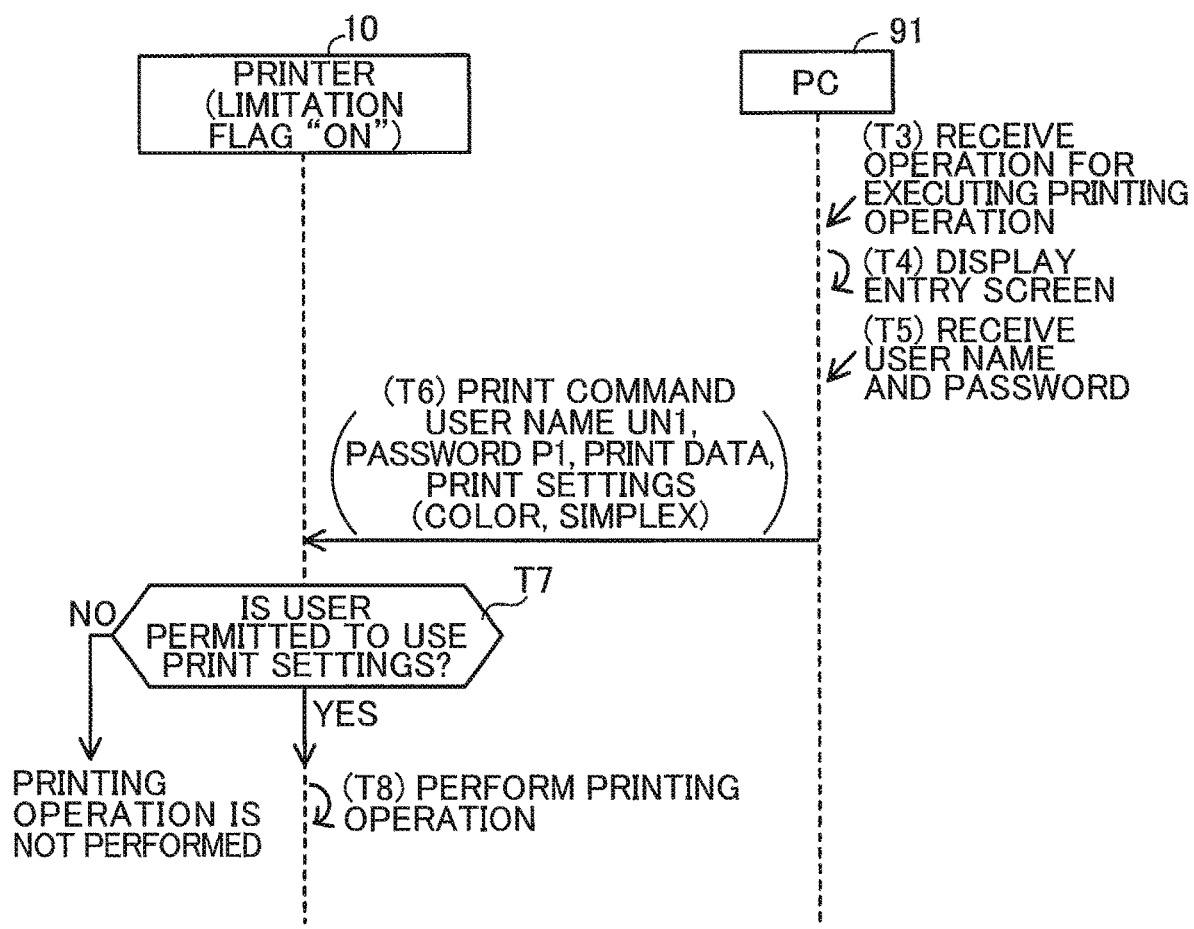
FIG. 2 is a sequence diagram illustrating a normal printing process according to the first embodiment.

Next, a normal printing process executed by the printer 10 and PC 91 will be described with reference to FIG. 2. In the normal printing process, the PC 91 controls the printer 10 to execute a printing operation by transmitting print data generated by the printer driver 92 to the printer 10. In other words, in the normal printing process the PC 91 prints on the printer 10 without going through the server 50. As indicated in FIG. 2, the limitation flag 40 of the printer 10 is set to "ON" in the normal printing process. To facilitate understanding, the CPU of each device (such as the CPU 32 of the printer 10) will not be described as the agent which executes operations, but rather each device itself (the printer 10, for example) will be described as the agent. Further, all communications performed by the printer 10 are implemented via the network interface 16. With this understanding, the following description omits the expression "via the network interface 16."

In T3 of FIG. 2, the first user executes an operation for executing a printing operation on the PC 91. The operation for executing the printing operation includes an operation for selecting an image file representing a target image for printing, and an operation for specifying print settings. In the normal printing process, the PC 91 uses the printer driver 92 to convert the image file in conformance with the print settings to generate print data having a format that the printer 10 can interpret.

In T4 the PC 91 displays an entry screen in which the user can input a username and a password. In T5 the PC 91 accepts from the first user input for a username and a password. In this case, the first user inputs the username UN1 and the password P1. In T6 the PC 91 transmits a print command to the printer 10 for controlling the printer 10 to execute a printing operation. The print command includes the username UN1 and the password P1 inputted in T5, the converted print data, and the print settings specified in T3 (color and simplex in the example of FIG. 2).

In T6 the printer 10 receives the print command from the PC 91. In T7 the printer 10 determines that the limitation flag 40 in the memory 34 is set to "ON" and determines whether the first user is permitted to use the print settings that are included in the print command Specifically, the printer 10 identifies the limitation information in the table 38 associated with the username UN1 and the password P1. Next, the printer 10 determines whether use of the print settings included in the print command (i.e., color and simplex) are permitted based on the identified limitation information. In this example, the printer 10 determines that the first user is permitted to use the print settings (T7: YES), and in T8 controls the print execution unit 18 to perform a printing operation based on the print settings (color and simplex), and the print data included in the print command. The printer 10 does not execute a printing operation when determining that use of the print settings included in the print command is not allowed (T7: NO).

As described above, when an instruction to execute a printing operation is issued from the first user and is not issued via the server 50 (T6), the printer 10 executes a printing operation that conforms with print settings available to the first user based on limitation information in the table 38 associated with the first user and does not execute a printing operation conforming with print settings not available to the first user. This method can prevent the printer 10 from executing a printing operation conforming with print settings that the user is not allowed to use.

Registration Process: Case A

Figure 3:
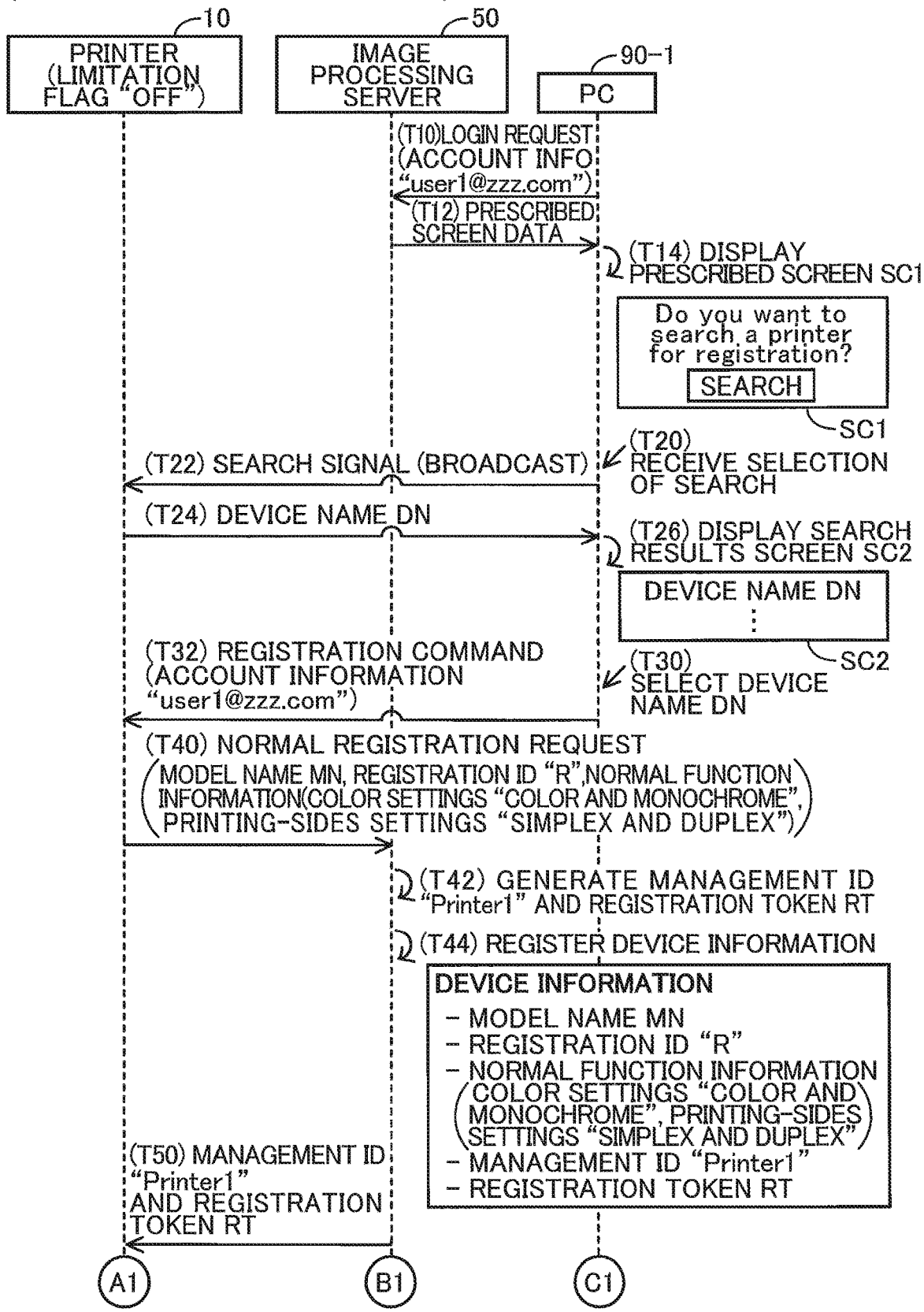
FIG. 3 is a sequence diagram illustrating a part of a registration process in Case A according to the first embodiment.
Figure 4:
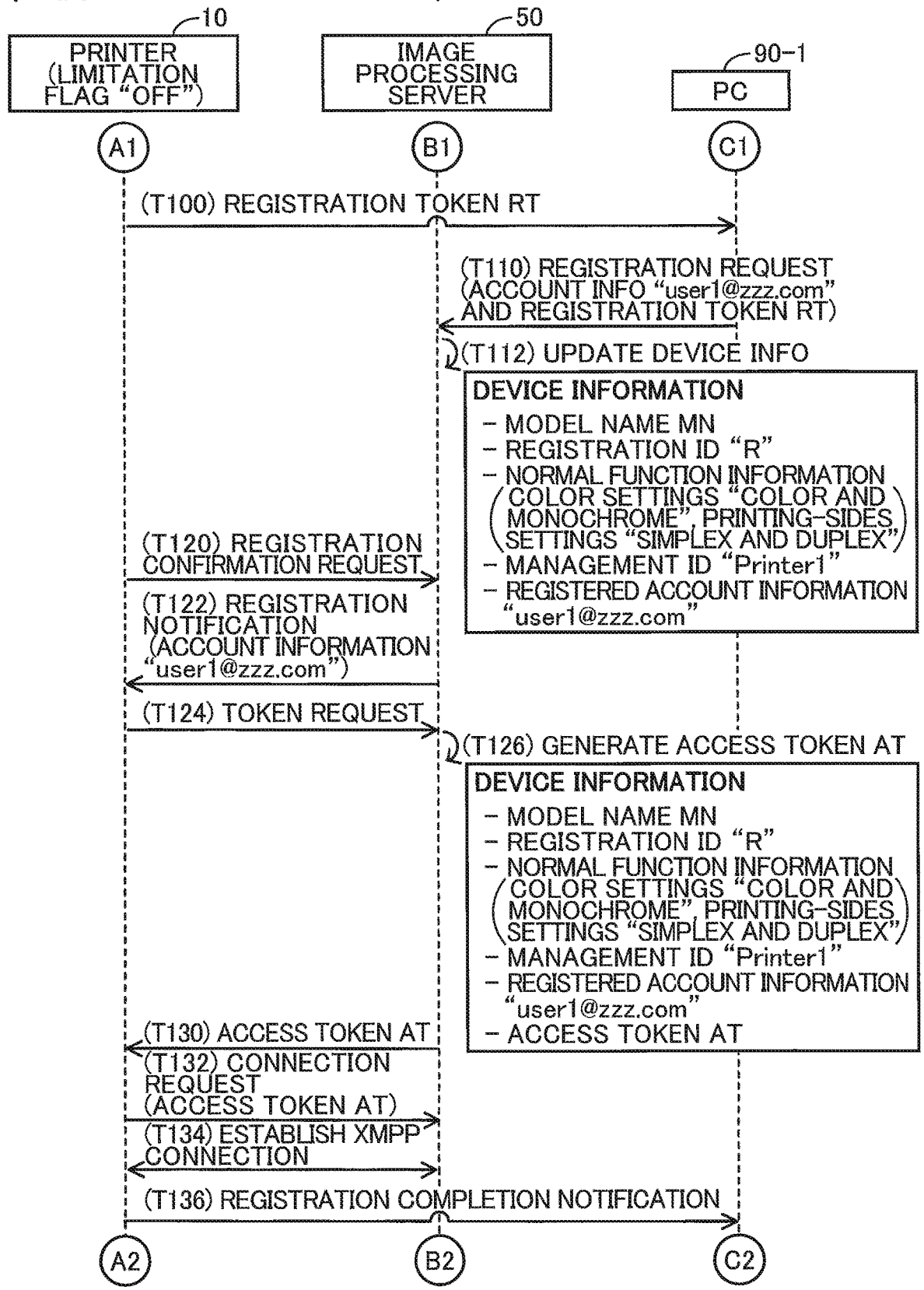
FIG. 4 is a sequence diagram illustrating a remaining part of the registration process in Case A according to the first embodiment.

Next, a registration process for registering the printer 10 on the server 50 will be described with reference to FIGS. 3 and 4. The registration process in FIGS. 3 and 4 is a first case that will hereinafter be referred to as Case A of the registration process. In the initial state of Case A shown in FIG. 3, the limitation flag 40 of the printer 10 is set to "OFF". The following steps performed by the PCs 90-1 and the like are executed according to a web browser.

The registration process begins when the PC 90-1 receives input for the account information "user1@zzz.com" and an instruction to log in to the server 50 from the first user identified by the username UN1 and the password P1. In T10, the PC 90-1 transmits a login request including this account information to the server 50.

In T10 the server 50 receives the login request from the PC 90-1. After recording the account information included in the login request, in T12 the server 50 transmits prescribed screen data representing a prescribed screen SC1 to the PC 90-1.

Upon receiving the prescribed screen data from the server 50 in T12, in T14 the PC 90-1 displays the prescribed screen SC1 represented by the prescribed screen data. The prescribed screen SC1 includes a search button for issuing an instruction to search for printers present in the vicinity of the PC 90-1. In T20 the first user selects the search button in the prescribed screen SC1, prompting the PC 90-1 to broadcast a search signal over the LAN 6 in order to search for printers.

In T22 the printer 10 receives the search signal from the PC 90-1, and in T24 transmits the device name DN of the printer 10 to the source of the search signal, i.e., the PC 90-1.

After receiving the device name DN from the printer 10 in T24, in T26 the PC 90-1 displays a search results screen SC2 that include the received device name DN. In T30 the PC 90-1 receives a selection for the device name DN from the first user. In this case, in T32 the PC 90-1 transmits to the printer 10 having the device name DN a registration command that includes the account information "user1@zzz.com", which is the account information for the user currently logged in to the server 50. The registration command is for instructing the printer 10 to register information related to the printer 10 on the server 50.

Upon receiving the registration command from the PC 90-1 in T32, the printer 10 determines that the limitation flag 40 in the memory 34 is set to "OFF" and in T40 transmits a normal registration request to the server 50. The normal registration request is for requesting the server 50 to register the printer 10 and includes the model name MN of the printer 10, the registration ID "R" preset on the printer 10, and normal function information. The normal function information is information for specifying that all four print setting combinations can be specified, and includes the two color settings "color" and "monochrome" and the two printing-sides settings "simplex" and "duplex."

Upon receiving the registration request from the printer 10 in T40, the server 50 determines whether the registration ID "R" included in the registration request is already registered on the server 50. In this case, the server 50 determines that the registration ID "R" has not yet been registered and executes the process from T42. However, if the server 50 determines that the registration ID "R" is already registered, the server 50 ends the registration process without executing the steps beginning from T42.

In T42 the server 50 generates a management ID "Printer1" and a registration token RT. Here, the server 50 generates the management ID "Printer1" and the registration token RT with unique values that were not previously generated for a management ID and a registration token. In T44 the server 50 registers the device information. The device information is information correlating values for various items included in the registration request of T40 (i.e., the model name MN, the registration ID "R", and the normal function information) with the generated management ID "Printer1" and the generated registration token RT. In T50 the server 50 transmits the management ID "Printer1" and the registration token RT to the printer 10.

When the printer 10 receives the management ID "Printer1" and the registration token RT from the server 50 in T50 of FIG. 3, in T100 of FIG. 4 the printer 10 transmits the registration token RT to the PC 90-1. At this time, the printer 10 begins periodically transmitting a registration confirmation request (see T120 described later) to the server 50 in order to confirm whether registration of the account information "user1@zzz.com" on the server 50 is complete.

After receiving the registration token RT from the printer 10 in T100, in T110 the PC 90-1 transmits a registration request to the server 50 that includes the account information "user1@zzz.com" and the registration token RT. The registration request is a command for requesting the server 50 to register the account information.

When the server 50 receives the registration request from the PC 90-1 in T110, in T112 the server 50 determines whether the registration token RT included in the registration request matches the registration token RT registered in T44 of FIG. 3. In this case, the server 50 determines that the registration tokens match and updates the device information. Specifically, the server 50 registers in the device information the account information "user1@zzz.com" included in the registration request as registered account information so as to be in association with the various values registered in T44 of FIG. 3. Note that since the registration token RT will not be used in subsequent steps, the registration token RT has been omitted from the device information shown beginning from step T112 in FIG. 4.

In T120 the server 50 receives the registration confirmation request from the printer 10. In this case, the server 50 transmits a registration notification to the printer 10 in T122 that includes the registered account information "user1@zzz.com". This registration notification is information for notifying the printer 10 that registration of the account information is complete.

When the printer 10 receives the registration notification from the server 50 in T122, in T124 the printer 10 transmits a token request to the server 50. A token request is a command for requesting the server 50 to transmit an access token.

Upon receiving the token request from the printer 10 in T124, in T126 the server 50 generates an access token AT configured of a unique character string. The server 50 also registers this access token AT so as to be in association with the various values in the device information updated in T112. In T130 the server 50 transmits the access token AT to the printer 10. The server 50 may also generate a refresh token for producing a new access token in the event that the period of validity for the access token AT has expired, and may transmit this refresh token to the printer 10. In general, the server 50 may transmit any information capable of authenticating the printer 10.

Upon receiving the access token AT from the server 50 in T130, the printer 10 stores the access token AT in the memory 34 and in T132 transmits a connection request to the server 50 that includes the access token AT. The connection request is a command for requesting the server 50 to establish an eXtensible Messaging and Presence Protocol (XMPP) connection, also referred to as a continuous connection.

Upon receiving the connection request from the printer 10 in T132, the server 50 determines that the access token AT included in the connection request matches the access token AT in the registered device information (see T126) and in T134 establishes an XMPP connection with the printer 10. Once the XMPP connection has been established in this way, the server 50 can use the XMPP connection to send signals (a job notification in T300 of FIG. 7 described later, for example) to the printer 10 through the firewall of the LAN 6 without needing to receive signals from the printer 10.

Further, once the XMPP connection has been established with the server 50 in T134, in T136 the printer 10 transmits a registration completion notification to the PC 90-1. The registration completion notification is information for specifying that registration on the server 50 is complete. Once the process in T136 has been completed, the process for Case A of the registration process ends.

Sharing Process

Figure 5:
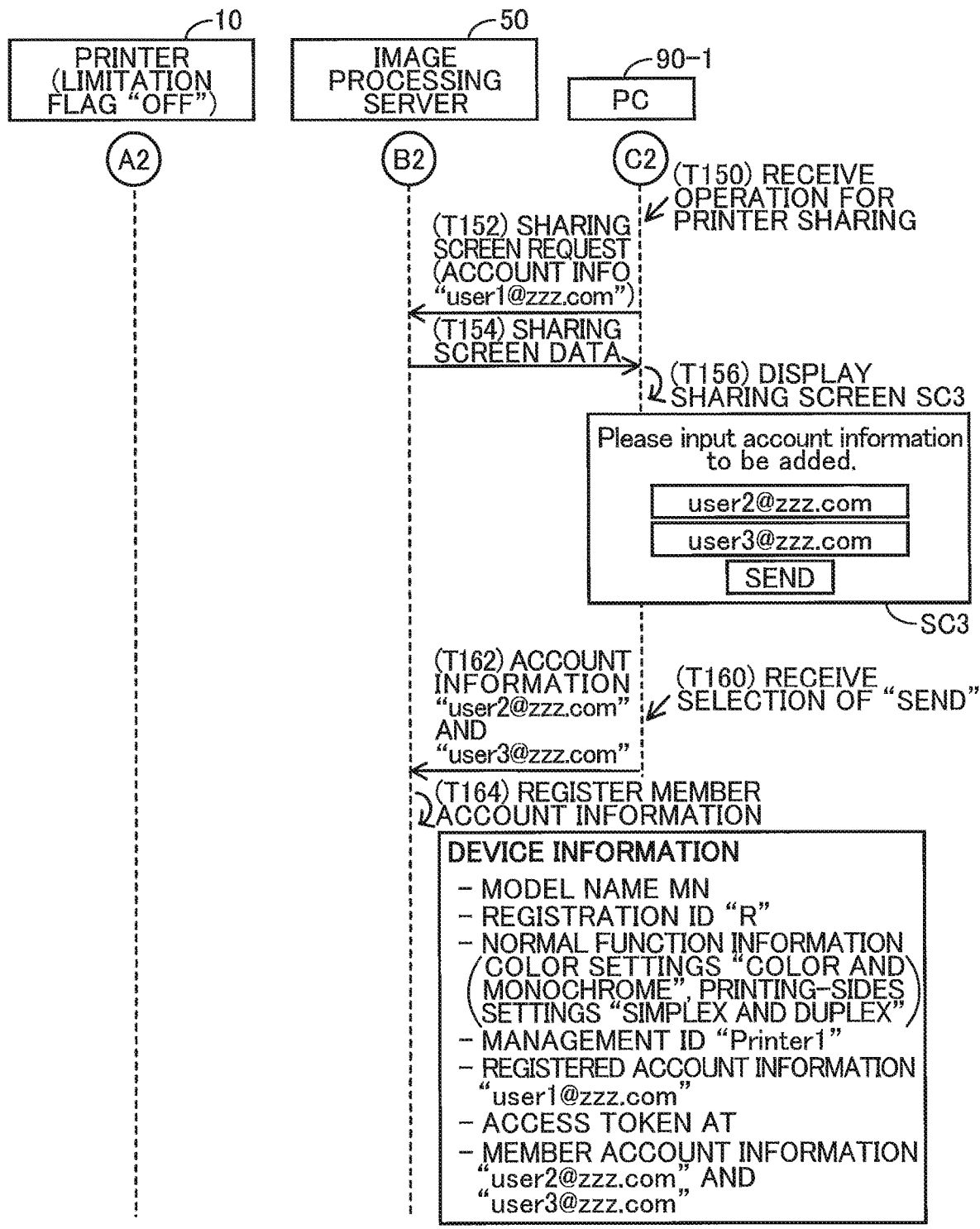
FIG. 5 is a sequence diagram illustrating a sharing process according to the first embodiment.

Next, a sharing process for sharing the printer 10 registered on the server 50 with other users will be described with reference to FIG. 5. The process of FIG. 5 is executed after the first user has executed the registration process in FIGS. 3 and 4. As described above, the registration ID "R" for the printer 10 is registered on the server 50 in T44 of FIG. 3. Therefore, if the second user using the account information "user2@zzz.com" performs the same process in T10-T40 of FIG. 3, the server 50 does not execute the process beginning from T42 since the registration ID "R" is already registered on the server 50. Therefore, in the embodiment the sharing process described below is implemented in order to share the printer 10 among a plurality of users.

In T150 of FIG. 5, the PC 90-1 receives input from the first user for the account information "user1@zzz.com" and a printer sharing operation for sharing the printer 10 with other users. In T152 the PC 90-1 transmits a sharing screen request including this account information "user1@zzz.com" to the server 50.

When the server 50 receives the sharing screen request from the PC 90-1 in T152, in T154 the server 50 transmits sharing screen data representing a sharing screen SC3 to the PC 90-1.

Upon receiving the sharing screen data from the server 50 in T154, in T156 the PC 90-1 displays the sharing screen SC3 represented by the sharing screen data. The sharing screen SC3 includes entry fields for inputting account information which identify users who will share the printer 10, and a Send button for transmitting the account information inputted in these entry fields to the server 50.

In T160 the PC 90-1 receives from the first user input including the account information "user2@zzz.com" for the second user and the account information "user3@zzz.com" for the third user, and a selection for the Send button. In this case, in T162 the PC 90-1 transmits the inputted information "user2@zzz.com" and "user3@zzz.com" for two accounts to the server 50.

When the server 50 receives from the PC 90-1 the account information for the two accounts in T162, in T164 the server 50 registers the account information "user2@zzz.com" and "user3@zzz.com" for the two accounts as member account information for sharing so as to be in association with the values in the device information updated in T126 of FIG. 4. In this way, the second or third user can use their own account information to execute printing operations on the printer 10 via the server 50.

Server Printing Process: Case A

Figure 6:
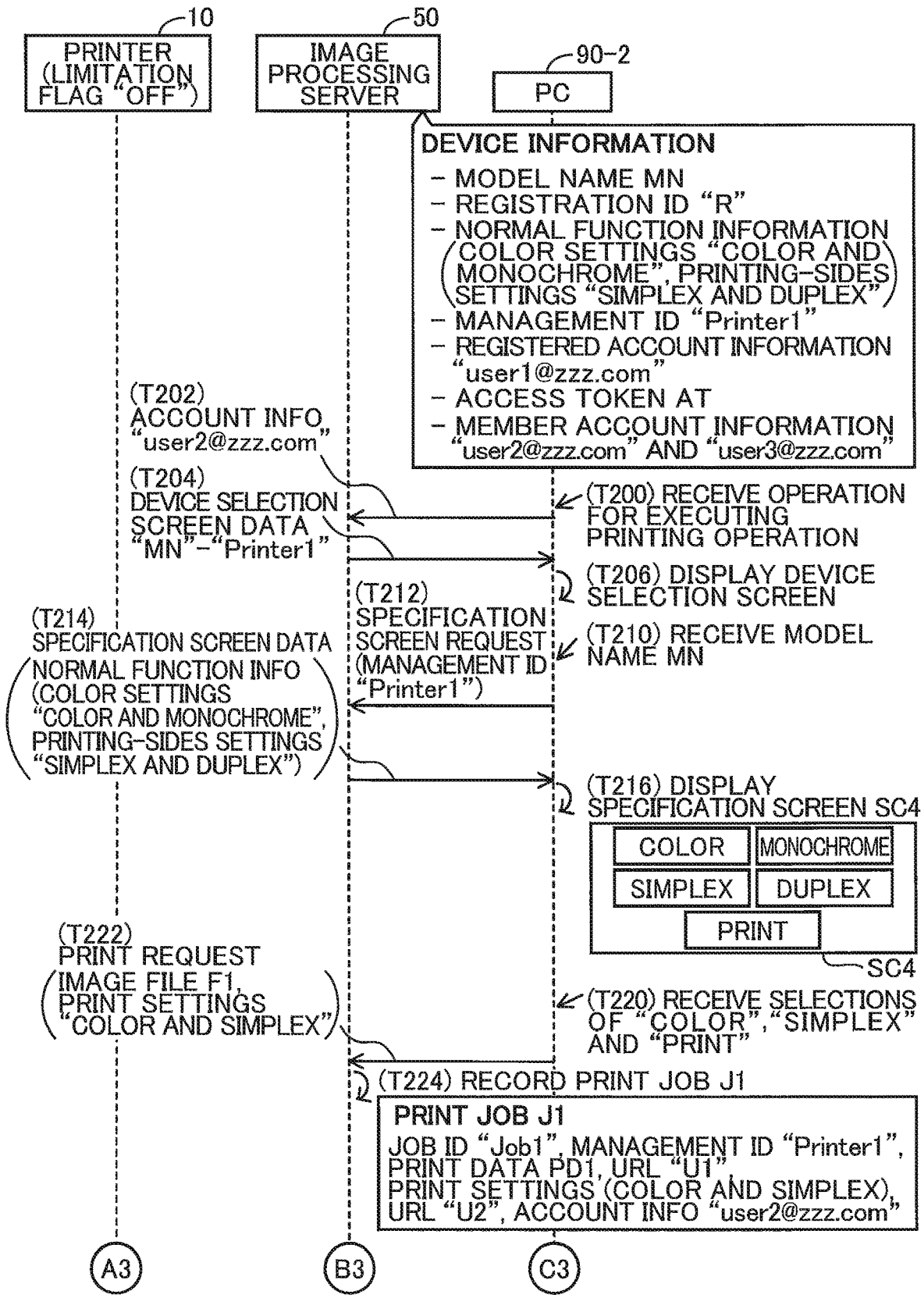
FIG. 6 is a sequence diagram illustrating a part of a server printing process in Case A according to the first embodiment.

Next, a server printing process for executing a printing operation on the printer 10 using the server 50 will be described with reference to FIGS. 6 and 7. The server printing process in this example is a first case that will hereinafter be referred to as Case A of the server printing process. The process of FIG. 6 is executed after the sharing process in FIG. 5 has been executed. In T200 of FIG. 6, the PC 90-2 receives input from the second user for the account information "user2@zzz.com," and an operation for executing a printing operation on the printer 10. Upon receiving this input, in T202 the PC 90-2 transmits this account information "user2@zzz.com" to the server 50.

When the server 50 receives account information from the PC 90-2 in T202, in T204 the server 50 identifies the device information that includes the account information "user2@zzz.com", and transmits device selection screen data to the PC 90-2 that includes information indicating that the model name MN and the management ID "Printer1", which are included in the identified device information, are correlated with each other.

When the PC 90-2 receives the device selection screen data from the server 50 in T204, in T206 the PC 90-2 displays the device selection screen represented by this screen data. The device selection screen includes the model name MN. When the second user selects the model name MN in the device selection screen, the PC 90-2 receives this selection in T210, and in T212 transmits to the server 50 a specification screen request that includes the management ID "Printer1" associated with the model name MN. The specification screen request is a command for requesting the server 50 to transmit data representing a screen for selecting print settings.

When the server 50 receives the specification screen request from the PC 90-2 in T212, the server 50 identifies the normal function information (i.e., the color settings "color" and "monochrome" and the printing-sides setting "simplex" and "duplex") associated with the management ID "Printer1" that is included in the specification screen request. The server 50 generates specification screen data representing a specification screen SC4 in which a user can select one print setting combination from among the four print setting combinations specified by the identified normal function information. In T214 the server 50 transmits this specification screen data to the PC 90-2.

When the PC 90-2 receives the specification screen data from the server 50 in T214, in T216 the PC 90-2 displays the specification screen SC4 represented by this specification screen data. The specification screen SC4 includes buttons for specifying a value for the color setting (i.e., "color" and "monochrome"), buttons for specifying a value for the printing-sides setting (i.e., "simplex" and "duplex"), and a Print button for executing the printing operation on the printer 10. In T220 the PC 90-2 receives the specifications "color" and "simplex" in the specification screen and a selection for the Print button from the second user, thereby receiving print settings, that is, one print setting combination. Subsequently, the PC90-2 receives a selection for an image file F1, which is stored in the PC90-2 for example, representing the image to be printed through an operation by the second user. In T222 the PC 90-2 transmits a print request to the server 50 that includes the image file F1 and the specified print settings (i.e., color and simplex).

When the server 50 receives the print request from the PC 90-2 in T222, in T224 the server 50 converts the image file F1 into print data PD1 having a data format that the printer 10 can interpret, and generates a job ID "Job1" as information for specifying a print job J1. Next, the server 50 records the print job J1 therein. The print job J1 includes the job ID "Job 1" generated above, the management ID "Printer1" received in T212, the print data PD1 generated above, a uniform resource locator (URL) "U1" specifying the storage location for the print data PD1 on the server 50, the print settings received in T222 (i.e., color and simplex), a URL "U2" specifying the storage location for the print settings on the server 50, and the account information "user2@zzz.com" received in T202.

Figure 7:
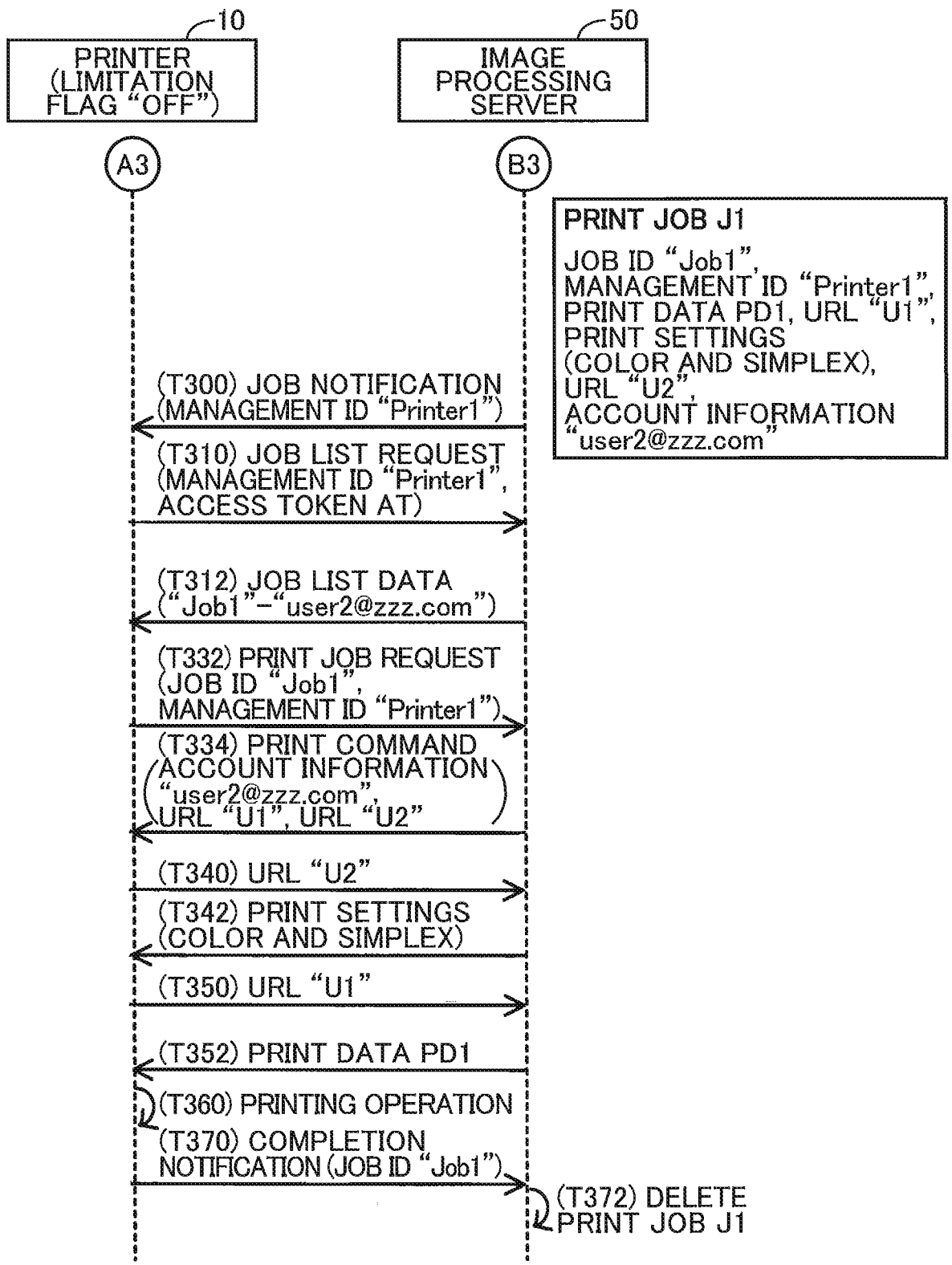
FIG. 7 is a sequence diagram illustrating a remaining part of the server printing process in Case A according to the first embodiment.

After the server 50 has recorded the print job J1 in T224 of FIG. 6, in T300 of FIG. 7 the server 50 uses the XMPP connection (see T134 of FIG. 4) to transmit a job notification including the management ID "Printer1" to the printer 10. The job notification is information notifying the printer 10 that a print job has been recorded.

When the printer 10 receives the job notification from the server 50 in T300, in T310 the printer 10 transmits a job list request to the server 50. The job list request is a command for requesting the server 50 to transmit job list data representing a list of print jobs recorded on the server 50. The job list request includes the management ID "Printer1" and the access token AT.

When the server 50 receives the job list request from the printer 10 in T310, in T312 the server 50 identifies the print job J1 that includes the management ID "Printer1" matching the management ID included in the job list request, and transmits to the printer 10 job list data that includes information indicating that the job ID "Job1" and the account information "user2@zzz.com", which are included in the identified print job J1, are correlated with each other.

When the printer 10 receives the job list data from the server 50 in T312, in T332 the printer 10 transmits to the server 50 a print job request that includes the job ID "Job1" matching the job ID included in the received job list data and the management ID "Printer1."

After receiving the print job request from the printer 10 in T332, in T334 the server 50 identifies the print job J1 including the job ID "Job1" matching the job ID included in the received print job request, and transmits a print command to the printer 10 that includes the account information "user2@zzz.com", the URL "U1", and the URL "U2" included in the identified print job J1.

When the printer 10 receives the print command from the server 50 in T334, the printer 10 performs the following steps in order to execute the printing operation. First, in T340 the printer 10 accesses the server 50 using the URL "U2" in the print command and in T342 receives the print settings (i.e., color and simplex) from the server 50. Next, in T350 the printer 10 accesses the server 50 using the URL "U1" in the print command, and in T352 receives the print data PD1 from the server 50. In T360 the printer 10 controls the print execution unit 18 to execute the printing operation according to the print settings received in T342 and the print data PD1 received in T352.

In T370 the printer 10 transmits a completion notification including the job ID "Job1" to the server 50. The completion notification is information used to notify the server 50 that the print job J1 has been processed.

After receiving the completion notification from the printer 10 in T370, in T372 the server 50 deletes the print job J1 that includes the job ID "Job1". After completing the process in T372, the server printing process in Case A ends.

Registration Process: Case B

Figure 8:
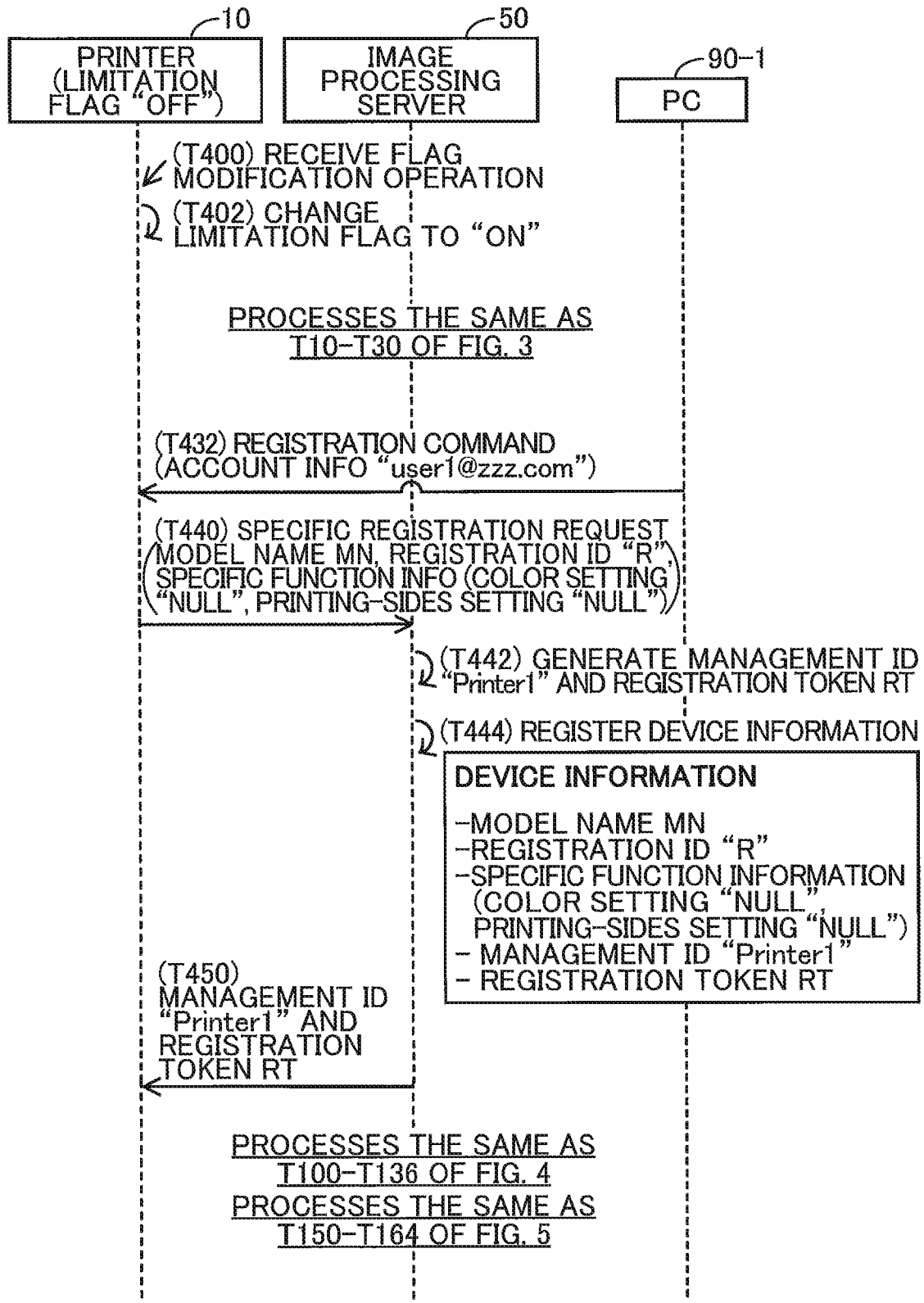
FIG. 8 is a sequence diagram illustrating a registration process in Case B according to the first embodiment.

Next, a second case for the registration process (hereinafter called Case B) will be described with reference to FIG. 8. The process in FIG. 8 is executed in place of the process in FIGS. 3 and 4. In T400 of FIG. 8, the printer 10 receives a flag modification operation from the first user for modifying the limitation flag 40 in the memory 34 from "OFF" to "ON". Upon receiving this flag modification operation, in T402 the printer 10 changes the limitation flag 40 from "OFF" to "ON". Thereafter, the same process described in T10-T30 of FIG. 3 is executed.

In T432 the printer 10 receives a registration command including the account information "user1@zzz.com" from the PC 90-1. Upon receiving this registration command, the printer 10 determines that the limitation flag in the memory 34 is set to "ON" and in T440 transmits a specific registration request to the server 50. The specific registration request includes the model name MN of the printer 10, the registration ID "R" preset for the printer 10, and specific function information. The specific function information is information for indicating that none of the four print setting combinations can be specified and does not include any of the values for color settings and printing-sides settings.

In T442 the server 50 performs the same process described in T42 of FIG. 3. In T44 the server 50 registers the device information. The device information differs from that in T44 of FIG. 3 in that the specific function information is included in place of the normal function information. Step T450 is identical to step T50 in FIG. 3. Thereafter, the same process described in T100-T136 of FIG. 4 and T150-T164 of FIG. 5 is executed. Hence, the server 50 records device information correlating the model name MN, the registration ID "R", the specific function information, the management ID "Printer1", the registered account information "user1@zzz.com", the access token AT, the registration token RT, and the member account information for two accounts (i.e., "user2@zzz.com" and "user3@zzz.com").

Server Printing Process: Case B

Figure 9:
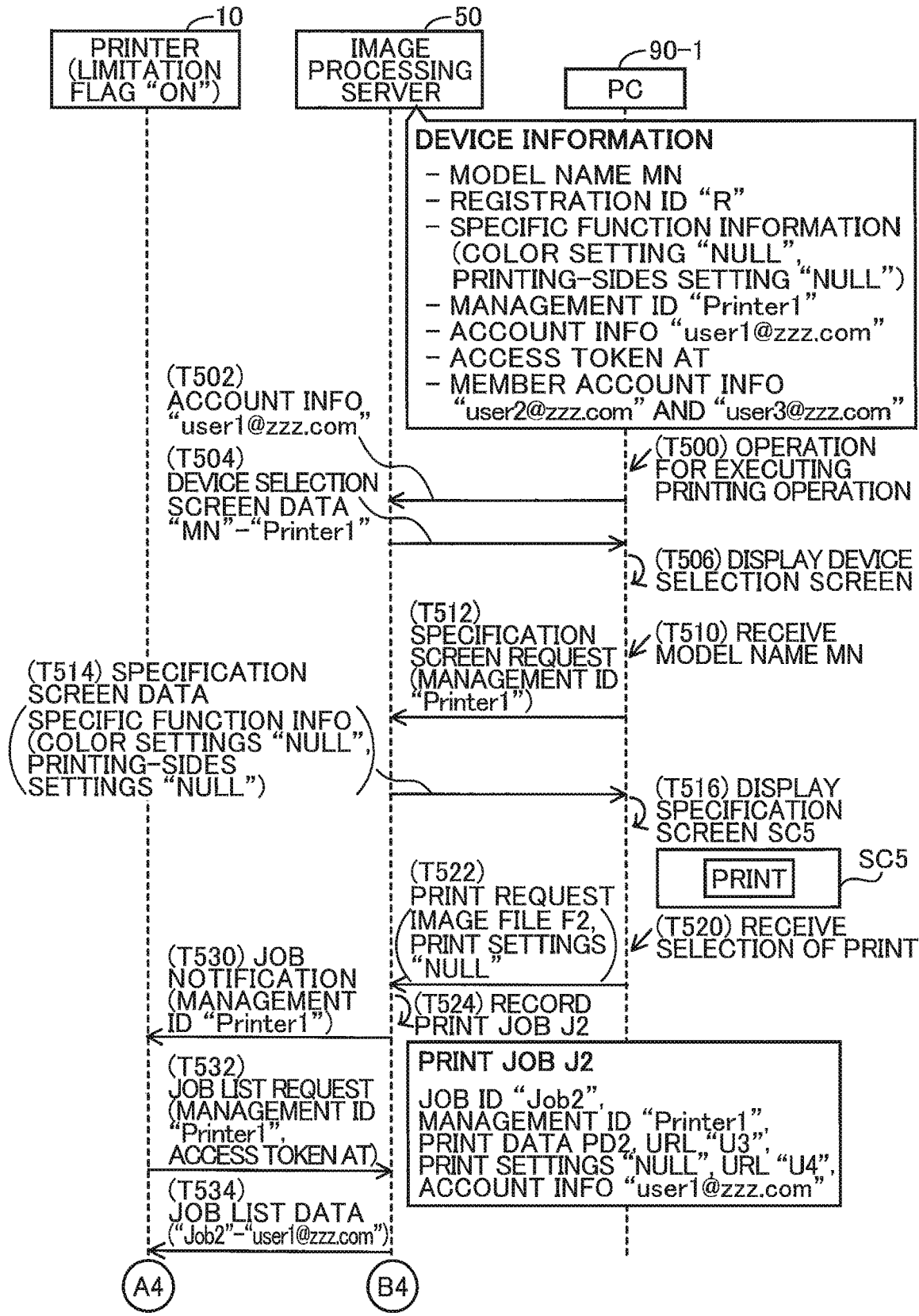
FIG. 9 is a sequence diagram illustrating a first part of a server printing process in Case B in which job list data including a job ID "job2" is discarded according to the first embodiment.

Next, a second case of the server printing process (hereinafter called Case B of the server printing process) will be described with reference to FIGS. 9 through 13. The process of FIG. 9 is executed after the process of FIG. 8. Steps T500-T512 are identical to steps T200-T212 of FIG. 6, except that the PC 90-1 is being used instead of the PC 90-2 and that the account information "user1@zzz.com" is used for the first user. When the server 50 receives the specification screen request from the PC 90-1 in T512, the server 50 identifies the specific function information (i.e., color setting "NULL" and printing-sides setting "NULL") associated with the management ID "Printer1" that is included in the specification screen request. The server 50 generates specification screen data representing a specification screen SC5 that conforms to the identified specific function information. Subsequently, in T514 the server 50 transmits this specification screen data to the PC 90-1.

Upon receiving the specification screen data from the server 50 in T514, in T516 the PC 90-1 displays the specification screen SC5 represented by the specification screen data. This specification screen SC5 includes a Print button, but does not include buttons for specifying print settings since the device information includes specific function information. In other words, the first user cannot specify print settings in the specification screen for the printing operation to be executed on the printer 10. The PC 90-1 receives a selection of the Print button from the first user in T520 and subsequently receives the selection of an image file F2 which is stored in the PC90-1 for example. Next, in T522 the PC 90-1 transmits to the server 50 a print request that includes the image file F2, and a print setting indicating that settings are unspecified (i.e., NULL).

When the server 50 receives the print request from the PC 90-1 in T522, in T524 the server 50 converts the image file F2 to generate print data PD2 and generates a job ID "Job2" for specifying a print job J2. Next, the server 50 records the print job J2. The print job J2 includes the job ID "Job2" generated above, the management ID "Printer1" received in T512, the print data PD2 generated above, a URL "U3" specifying the storage location of the print data PD2, the print setting received in T522 (i.e., NULL), a URL "U4" specifying the storage location of the print setting, and the account information "user1@zzz.com" received in T502.

Steps T530 and T532 are identical to steps T300 and T310 of FIG. 7. In T534 the server 50 identifies the print job J2 that includes the management ID "Printer1" and transmits to the printer 10 job list data that includes the job ID "Job2" and the account information "user1@zzz.com" that are included in the identified print job J2.

When the printer 10 receives the job list data from the server 50 in T534 of Case B, the printer 10 determines that the limitation flag 40 in the memory 34 is set to "ON" and subsequently determines whether the first user associated with the account information "user1@zzz.com" provided in the job list data is currently logged in to the printer 10. In Case B the printer 10 determines that the first user is not logged in to the printer 10. At the same time, the printer 10 uses the limitation information in the table 38 to determine whether the first user is permitted use of two or more print setting combinations. In Case B, the printer 10 determines that the first user is permitted use of two or more print setting combinations. Thus, the printer 10 discards the job list data without displaying a job list corresponding to the job list data on the display 14. Accordingly, the printer 10 does not perform printing on the basis of the print job J2 which is specified by the job list data at this stage. As described above, if the current user (the first user in this example) is permitted used of two or more print setting combinations, and if the current user is not logged in to the printer 10, the printer 10 discards the job list data as described in this example. On the other hand, if the current user is permitted use of only one print setting combination, the printer 10 will perform printing by using the permitted print setting combination on the basis of the print job specified by the job list data, as described later. Further, as described later, if the current user is permitted use of two or more print setting combinations, and if the current user is logged in to the printer 10, the printer 10 will receive a selection of a print setting combination by the current user in order to perform printing on the basis of the print job specified by the job list data according to the selected print setting combination.

Figure 10:
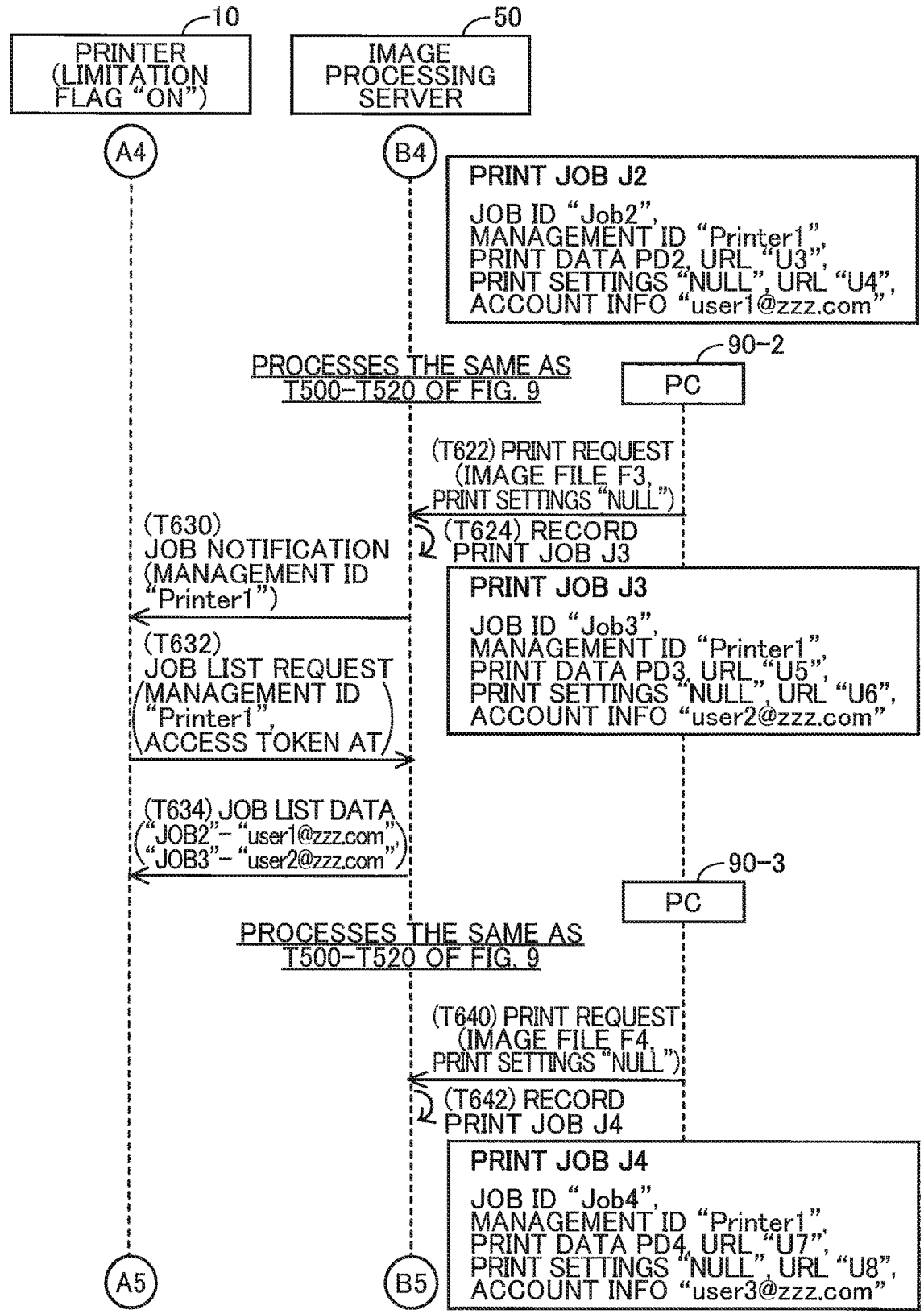
FIG. 10 is a sequence diagram illustrating a second part of the server printing process in Case B in which job list data including the job ID "job 2" and a job ID "job3" is discarded according to the first embodiment.

After the process S534 in FIG. 9, as shown in FIG. 10, the PC 90-2 executes a process with the server 50 that is identical to steps T500-T520 of FIG. 9, except that the PC 90-2 is being used instead of the PC 90-1 and that the account information "user2@zzz.com" is used for the second user, and an image file F3 is selected by the second user. In T622 the PC 90-2 transmits to the server 50 a print request that includes the image file F3 selected by the second user, and a print setting indicating that settings are unspecified (i.e., NULL).

Upon receiving the print request from the PC 90-2 in T622, in T624 the server 50 converts the image file F3 to generate print data PD3, generates a job ID "Job3", and a records a print job J3 specified by the job ID "Job3". The print job J3 includes the job ID "Job3", the management ID "Printer1", the print data PD3, a URL "U5" specifying the storage location of the print data PD3, the print setting received in T622 (i.e., NULL), a URL "U6" specifying the storage location of the print setting, and the account information "user2@zzz.com".

Steps T630 and T632 are identical to steps T300 and T310 of FIG. 7. In T634 the server 50 identifies the print jobs J2 and J3 including the management ID "Printer1" and transmits job list data to the printer 10. The job list data includes information indicating that the job ID "Job2" and the account information "user1@zzz.com", which are included in the identified print job J2, are correlated with each other, information indicating that the job ID "Job3" and the account information "user2@zzz.com", which are included in the identified print job J3, are correlated with each other.

When the printer 10 receives the job list data from the server 50 in T634, the printer 10 determines that the limitation flag 40 in the memory 34 is set to "ON" and determines that none of the first and second users is logged in to the printer 10. At the same time, the printer 10 determines that the first and second users are permitted to use two or more print setting combinations. In this case, the printer 10 discards the job list data without displaying a job list conforming to the job list data on the display 14. That is, the printer 10 does not perform printing on the basis of the print jobs J1 and J2 specified by the job list data at this stage.

Next, the PC 90-3 executes a process with the server 50 identical to the process in T500-T520 of FIG. 9, except that the PC 90-3 is being used instead of the PC 90-1 and that the account information "user3@zzz.com" is used for the third user, and an image file F4 is selected by the third user. In T640 the PC 90-3 transmits a print request to the server 50 that includes the image file F4 selected by the third user, and a print setting indicating that settings are unspecified (i.e., NULL).

When the server 50 receives the print request from the PC 90-3 in T640, in T642 the server 50 converts the image file F4 to generate print data PD4, generates a job ID "Job4", and records a print job J4 specified by the job ID "Job4". The print job J4 includes the job ID "Job4", the management ID "Printer1", the print data PD4, a URL "U7" indicating the storage location of the print data PD4, the print setting received in T640 (i.e., NULL), a URL "U8" specifying the storage location of the print setting, and the account information "user3@zzz.com".

Figure 11:
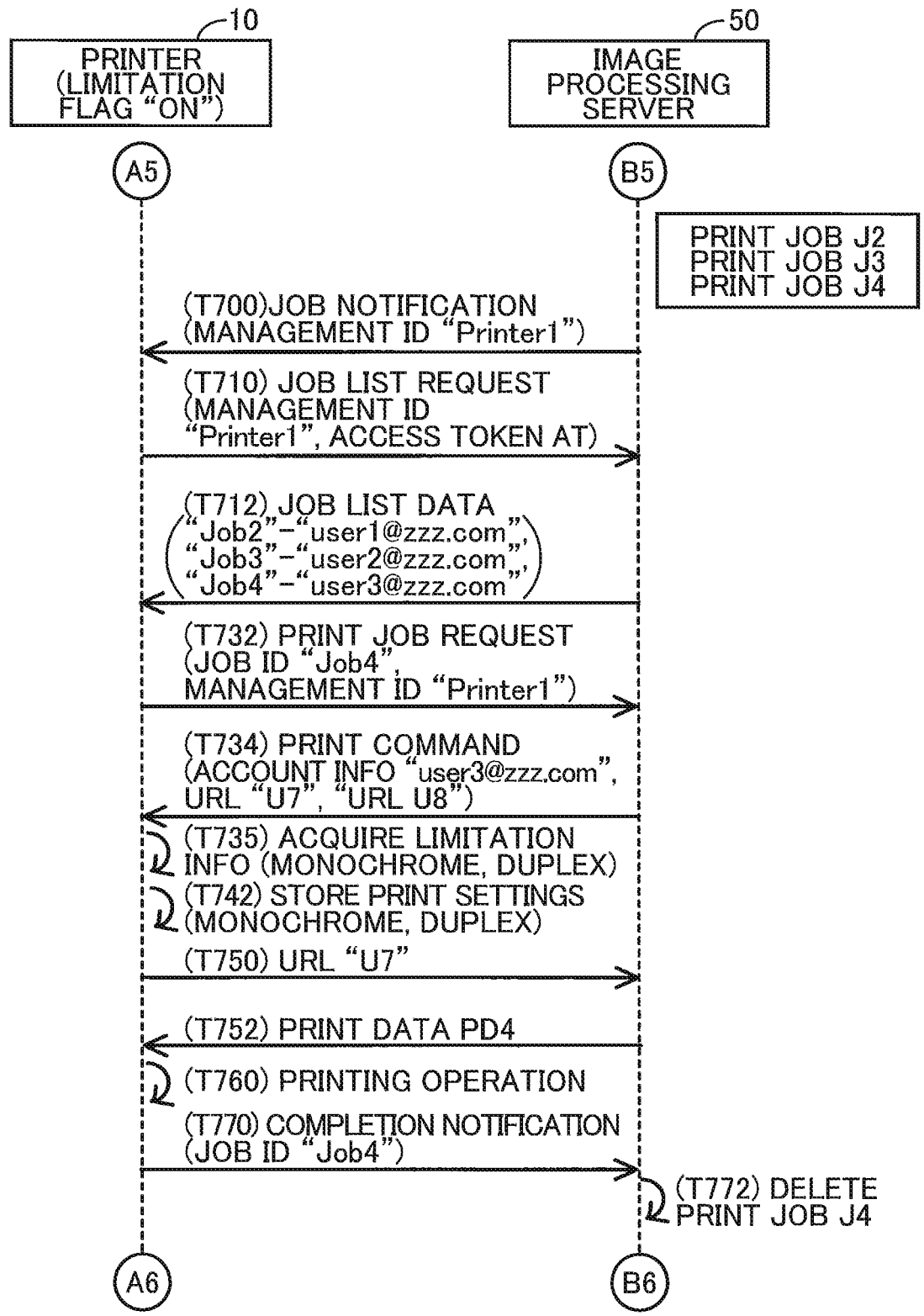
FIG. 11 is a sequence diagram illustrating a third part of the server printing process in Case B in which a print job having a job ID "job4" is executed according to the first embodiment.

After recording the print job J4 in T642 of FIG. 10, in T700 of FIG. 11 the server 50 transmits a job notification including the management ID "Printer1" to the printer 10.

Step T710 is identical to T310 of FIG. 7. In T712 the server 50 identifies each of the print jobs J2, J3, and J4 including the management ID "Printer1" and transmits job list data to the printer 10. The job list data includes information indicating that the job ID "Job2" and the account information "user1@zzz.com" are correlated with each other, information indicating that the job ID "Job3" and the account information "user2@zzz.com" are correlated with each other, and information indicating that the job ID "Job4" and the account information "user3@zzz.com" are correlated with each other.

Upon receiving the job list data from the server 50 in T712, the printer 10 determines that the limitation flag 40 in the memory 34 is "ON" and that none of the first, second, and third users is logged in to the printer 10. At the same time, the printer 10 determines that the third user is allowed to use only one print setting combination (i.e., monochrome and duplex). In this case, the printer 10 identifies the job ID "Job4" associated with the account information "user3@zzz.com" for the third user from the job list data received in T712. In T732 the printer 10 transmits to the server 50 a print job request that includes the identified job ID "Job4", and the management ID "Printer1".

Step T734 is identical to step T334 in FIG. 7, except that the print command includes the account information "user3@zzz.com" and the URLs "U7" and U8". Next, the printer 10 executes each of the following steps for implementing printing operations. That is, first the printer 10 determines that the limitation flag 40 in the memory 34 is set to "ON". In T735 the printer 10 acquires the limitation information associated with the third user in the table 38, and in T742 stores the print settings specified by the limitation information (i.e., monochrome and duplex). In this case, the printer 10 does not acquire print settings from the server 50 using the URL "U8", thereby reducing the processing load on the printer 10. Note that as a variation the printer 10 may access the server 50 using the URL "U8" and may acquire the print setting (NULL) from the server 50. After the printer 10 receives the print setting NULL, the printer 10 may acquire the limitation information associated with the third user in the table 38.

In T750 the printer 10 accesses the URL "U7" in the print command, and in T752 receives the print data PD4 from the server 50. In T760 the printer 10 controls the print execution unit 18 to execute a printing operation conforming to the stored print settings (i.e., monochrome and duplex) and the received print data PD4. Steps T770 and T772 are identical to steps T370 and T372 of FIG. 7, except that the job ID "Job4" is used.

As described above, the printer 10 does not display a screen for specifying print settings (e.g., the specification screen in T836 of FIG. 12 described later) when the acquired limitation information indicates only a single print setting combination (T735). Accordingly, this method can reduce the processing load on the printer 10. In a variation, the printer 10 may display a specification screen including a button indicating "monochrome" and a button indicating "duplex" according to the single print setting combination indicated by the limitation information.

Further, when the acquired limitation information specifies a single print setting (T735), the printer 10 executes the process from step T732 without requiring the third user to log in to the printer 10, and executes the printing operation in T760 without displaying a screen for specifying print settings. This method improves user-friendliness since the third user need not execute user operations on the printer 10, such as selection operations of the print settings, in order to control the printer 10 to execute a printing operation.

Figure 12:
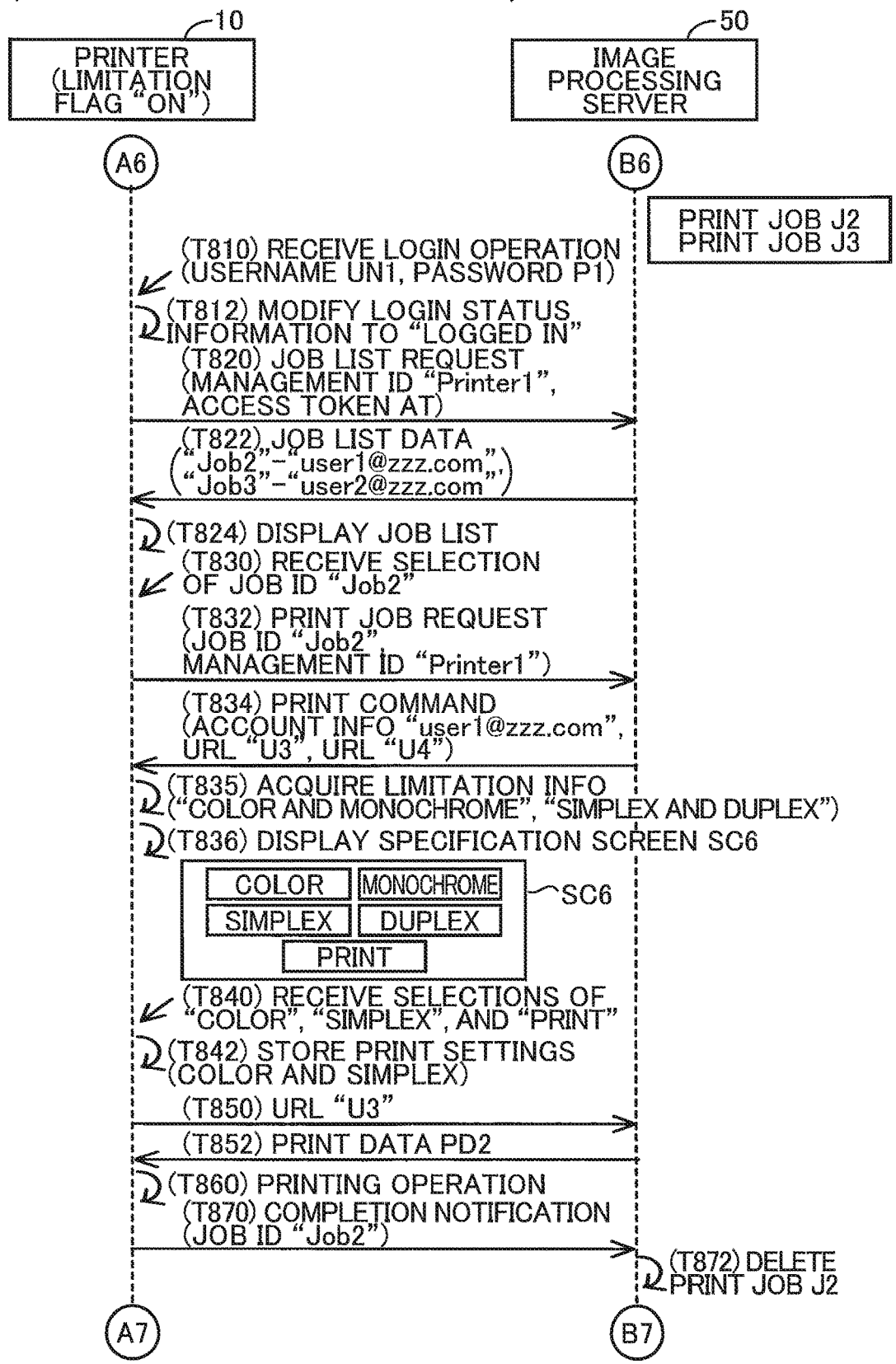
FIG. 12 is a sequence diagram illustrating a fourth part of the server printing process in Case B in which a print job having a job ID "job2" is executed according to the first embodiment.

After the process T772 is performed, in T810 of FIG. 12, the printer 10 receives a login operation from the first user that includes input for the username UN1 and the password P1. Upon receiving this login operation, in T812 the printer 10 modifies the login status information in the table 38 associated with the username UN1 and the password P1 from "logged out" to "logged in". In this case, in T820 the printer 10 transmits to the server 50 a job list request that includes the management ID "Printer1" and the access token AT.

Step T822 is identical to step T634 of FIG. 10. In this case, job list data transmitted in T822 includes information indicating that the job ID "Job2" and the account information "user1@zzz.com", which are included in the print job J2, are correlated with each other, and information indicating that the job ID "Job3" and the account information "user2@zzz.com", which are included in the print job J3, are correlated with each other. When the printer 10 receives the job list data from the server 50 in T822, the printer 10 determines that the login status information in the table 38 associated with the account information "user1@zzz.com" is "logged in", i.e., that the first user is currently logged in to the printer 10. Further, the printer 10 determines that the login status information in the table 38 associated with the account information "user2@zzz.com" is "logged out." In this case, in T824 the printer 10 displays a job list on the display 14 that includes the job ID "Job2" associated with the account information "user1@zzz.com" which is associated with the status information "logged in", but that does not include the job ID "Job3" associated with the account information "user2@zzz.com" which is associated with the status information "logged out".

In T830 the printer 10 receives a selection from the first user for the job ID "Job2" in the job list. Upon receiving this selection, in T832 the printer 10 transmits to the server 50 a print job request that includes the job ID "Job2" and the management ID "Printer1".

Step T834 is identical to step T334 of FIG. 7, except that the account information "user1@zzz.com" and the URLs "U3" and "U4" are used. Next, the printer 10 executes each of the following steps in order to implement a printing operation. Specifically, first the printer 10 determines that the limitation flag 40 in the memory 34 is set to "ON" and in T835 acquires the limitation information for the first user (i.e., "color and monochrome" and "simplex and duplex") in the table 38 associated with the account information "user1@zzz.com" in the print command. Next, the printer 10 generates specification screen data representing a specification screen SC6 in which the user can specify any of the four print setting combinations indicated by the limitation information. In T836 the printer 10 displays the specification screen SC6 represented by this specification screen data on the display 14. The specification screen SC6 includes two buttons for specifying values for the color setting (i.e., "color" and "monochrome"), two buttons for specifying values for the printing-sides setting (i.e., "simplex" and "duplex"), and a Print button for executing the printing operation on the printer 10.

In T840 the printer 10 receives selections from the first user in the specification screen SC6, including specifications for "color" and "simplex" and a selection of the Print button. In T842 the printer 10 stores the specified print settings (i.e., color and simplex). Next, in T850 the printer 10 accesses the server 50 using the URL "U3" in the print command and in T852 receives the print data PD2 from the server 50.

In T860 the printer 10 controls the print execution unit 18 to execute a printing operation conforming to the stored print settings (i.e., color and simplex) and the received print data PD2. Steps T870 and T872 are identical to steps T370 and T372 in FIG. 7, except that the job ID "Job2" is used.

As described above, the printer 10 executes the process beginning from T820 when the first user logs in to the printer 10 (T810). Here, the condition in which the first user is not logged in to the printer 10 denotes a high probability that the first user is in a relatively remote location to the printer 10. In this condition, if the process beginning from T820 were executed so that a job list were displayed on the printer 10, it is possible that a third party other than the first user could select the job ID "Job2" in the job list and execute the same process in T832-T872. Hence, the third party could take the printed matter. However, in the embodiment the printer 10 only executes the process from T820 when the first user is logged in to the printer 10, i.e., when the first user is relatively close to the printer 10, thereby preventing a third party from taking the printed matter. In a variation, the printer 10 may be configured to execute the process from T820 even when the first user is not logged in to the printer 10.

Figure 13:
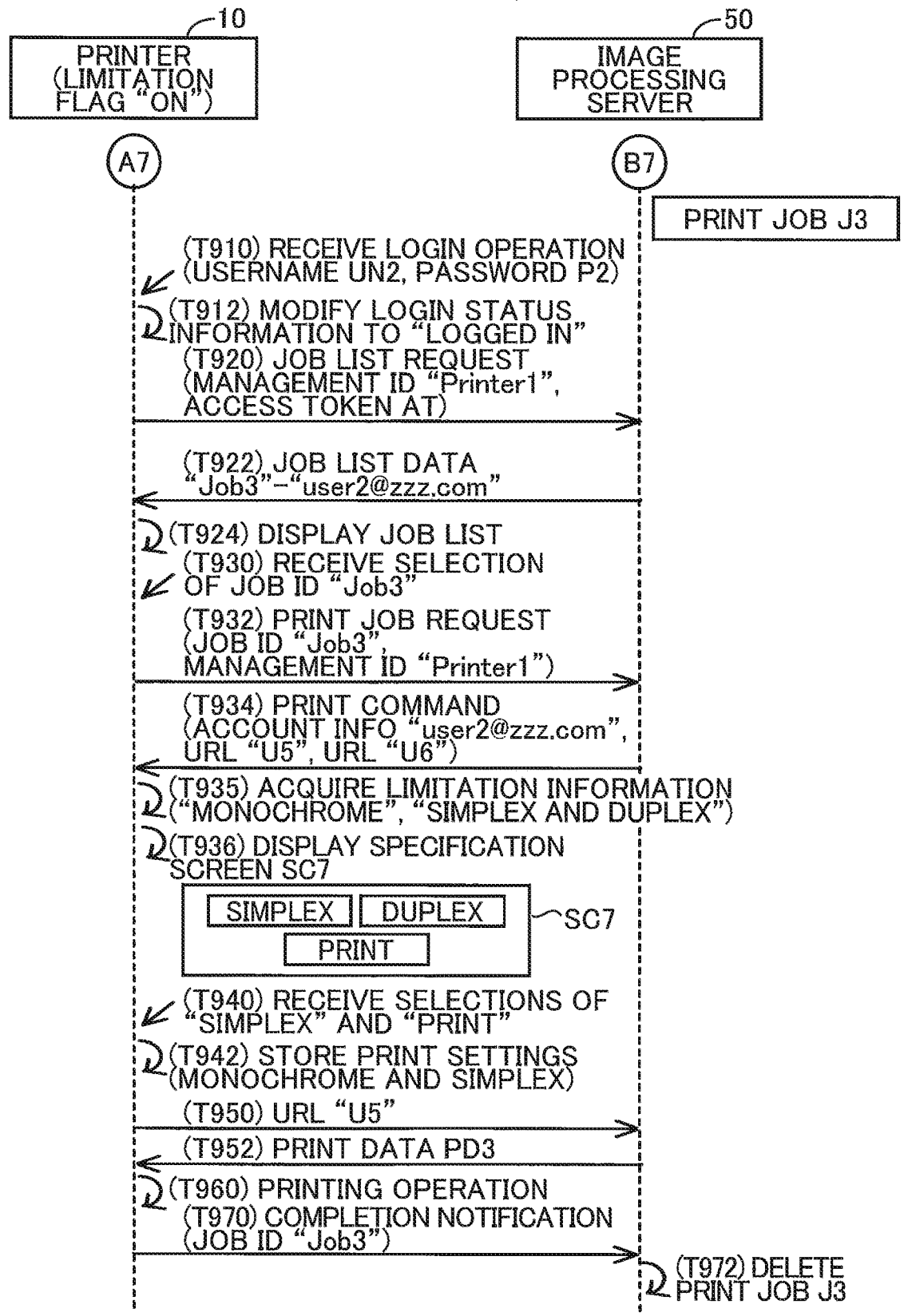
FIG. 13 is a sequence diagram illustrating a final part of the server printing process in Case B in which a print job having a job ID "job3" is executed according to the first embodiment.

After the step T872 is performed, as shown in FIG. 13, steps T910-T934 are performed. Steps T910-T934 are identical to steps T810-T834 of FIG. 12, except that the username UN2 and the password P2, the job ID "Job3", the account information "user2@zzz.com" for the second user, and the URLs "U5" and "U6" are used. In this case, the login status information for the username UN2 and the password P2 is modified into the "logged out" to "logged in". In this case, the second user may log out from the printer 10 and the login status information for the username UN1 and the password P1 may be modified into "logged in" to "logged out". In T935 the printer 10 acquires from the table 38 limitation information for the second user (i.e., "monochrome" and "simplex and duplex") corresponding to the account information "user2@zzz.com" in the print command received in T934, and generates specification screen data representing a specification screen SC7 in which the user can specify one of the two print setting combinations indicated by the limitation information. In T936 the printer 10 displays the specification screen SC7 represented by the specification screen data on the display 14. The specification screen SC7 does not include buttons for specifying a value for the color setting, but includes two buttons for specifying a value for the printing-sides setting (i.e., "simplex" and "duplex"), and a Print button for executing a printing operation on the printer 10. Accordingly, the printer 10 displays on the display 14 the specification screen SC7 that does not include buttons for specifying a value for the color setting when only one value (i.e., monochrome) can be specified as the value for the color setting according to the limitation information. Hence, the second user is not required to specify a value for the color setting in the specification screen, thereby improving user-friendliness. As a variation, the printer 10 may display a specification screen on the display 14 that also includes a button for specifying "monochrome."

In T940 the printer 10 receives selections from the second user including a specification for "simplex" and a selection of the Print button displayed in the specification screen SC7. In T942 the printer 10 stores the specified print settings (i.e., monochrome and simplex). Steps T950 and T952 are identical to steps T350 and T352 in FIG. 7, except that the URL "U5" and the print data PD3 are used.

In T960 the printer 10 controls the print execution unit 18 to execute a printing operation in conformance with the stored print settings (i.e., monochrome and simplex) and the received print data PD3. Steps T970 and T972 are identical to steps T370 and T372 of FIG. 7. After the process of T972 is completed, the process of FIG. 13 ends.

Effects of the Embodiment

In the embodiment, by transmitting the specific registration request including the specific function information to the server 50 (T440 of FIG. 8), the printer 10 can record the specific function information in association with the account information "user1@zzz.com" on the server 50 (T444, T112 of FIG. 8). Thus, when the server 50 receives the account information "user1@zzz.com" from the PC 90-1 (T502 of FIG. 9), the server 50 transmits the specification screen data to the PC 90-1 representing the specification screen SC5 that does not include buttons for specifying print settings (T514). Accordingly, the print settings are not specified on the PC 90-1 since the specification screen SC5 displayed on the PC 90-1 does not include buttons for specifying print settings (T516). In other words, by transmitting the registration request to the server 50 that includes the specific function information, the printer 10 receives from the server 50 the print command (T834 of FIG. 12) that includes the account information "user1@zzz.com", and the URL "U4" specifying the storage location of the print setting (NULL). Next, the printer 10 acquires limitation information (i.e., "color and monochrome" and "simplex and duplex") from the table 38 of the memory 34 associated with the account information "user1@zzz.com" (T835) and displays the specification screen SC6 in which the first user can specify one print setting combination from among four possible combinations identified by the limitation information, i.e., one combination of the four print setting combinations that the first user is permitted to use (T836). In this way, after the first user specifies print settings in the specification screen that the first user is permitted to use (i.e., color and simplex), the printer 10 can execute the printing operation conforming to these print settings (T860). Accordingly, the system 2 for executing printing operations on the printer 10 via the server 50, can suppress the printer 10 from executing printing operations according to print settings that the user is not allowed to use.

Note that it is possible to envision a situation in which the limitation flag 40 on the printer 10 is changed from "OFF" to "ON" after the process in FIGS. 3 and 4 are executed, i.e., after the device information including the normal function information is recorded on the server 50. In this case, the printer 10 transmits a device information updating command to the server 50 in order to record the specific function information on the server 50 in place of the normal function information. As a result, device information including the specific function information instead of the normal function information is recorded on the server 50. Thus, even in such a situation, the system 2 that implements printing on the printer 10 via the server 50 can suppress the printer 10 from executing printing according to print settings that the user is not permitted to use.

Correspondences

The printer 10, the image processing server 50, and the PCs 90-1, 90-2, 90-3, and 91 are respectively examples of the image processing apparatus, the server, and the terminal device. The printing operation, the print execution unit 18, the print setting (the print setting combination) are respectively examples of the image process, the image processing device, and the image processing settings. The specific function information and the normal function information are respectively examples of the incapability information and the capability information. The specific registration request and the normal registration request are respectively examples of the first registration request and the second registration request. The account information "user1@zzz.com" for the first user, the account information "user2@zzz.com" for the second user, and the account information "user3@zzz.com" for the third user are examples of the account information. The specification screen SC5 (FIG. 9) and the specification screen SC4 (FIG. 6) are respectively examples of the first selection screen and the second selection screen. The color setting and the printing-sides setting are examples of the first setting item and the second setting item. Print buttons, buttons for specifying print settings, buttons for buttons for specifying the color setting, and the buttons for specifying the printing-sides setting in the specification screens are respectively examples of the operation specification area, the settings specification area, the first specification area, and the second specification area. The print request in T522 (FIG. 9), (or T622 and T640 (FIG. 10)) and the print request in T222 (FIG. 6) are respectively examples first function execution request and the second function execution request. The URL "U4" (or, the URL "U6" and "U8") and the URL "U2" are respectively examples of the first relation information and the second relation information. The user management table 38 is an example of the memory. The limitation information in the user management table 38 is an example of the setting specification information. The print settings ("color" and "simplex") in T842 and the print settings ("color" and "simplex") in T222 are examples of the first image processing settings and the second image processing settings.

The state where the limitation flag 40 in the memory 34 is set to "ON" and the state where the limitation flag 40 is set to "OFF" are respectively examples of the first mode and the second mode. The user name and the password are respectively examples of the user identification information. The print data PD1-PD4 are examples of the image data.

The process T32 of FIG. 3 (or, the process T432 of FIG. 8), the process T400 of FIG. 8, the process T734 of FIG. 11 (or, the process T834 of FIG. 12, the process T934 of FIG. 13), the process T735 of FIG. 11 (or, the process T835 of FIG. 12, the process T935 of FIG. 13), and the process T760 of FIG. 11 (or, the process T860 of FIG. 12, the process T960 of FIG. 12) are examples of the receiving a registration instruction step, the transmitting a first registration request step, the receiving a first function execution request step, the acquiring setting specification information step, the displaying step, and the controlling to execute the image process in accordance with the first setting step.

Second Embodiment

Next, a second embodiment of the present disclosure will be described with reference to FIG. 14. In the second embodiment, the printer 10 is provided with a web server function and can receive instructions for the server from a PC or other external device. The registration process of FIG. 14 is executed in the second embodiment in place of the registration process of the first embodiment shown in FIG. 8.

Figure 14:
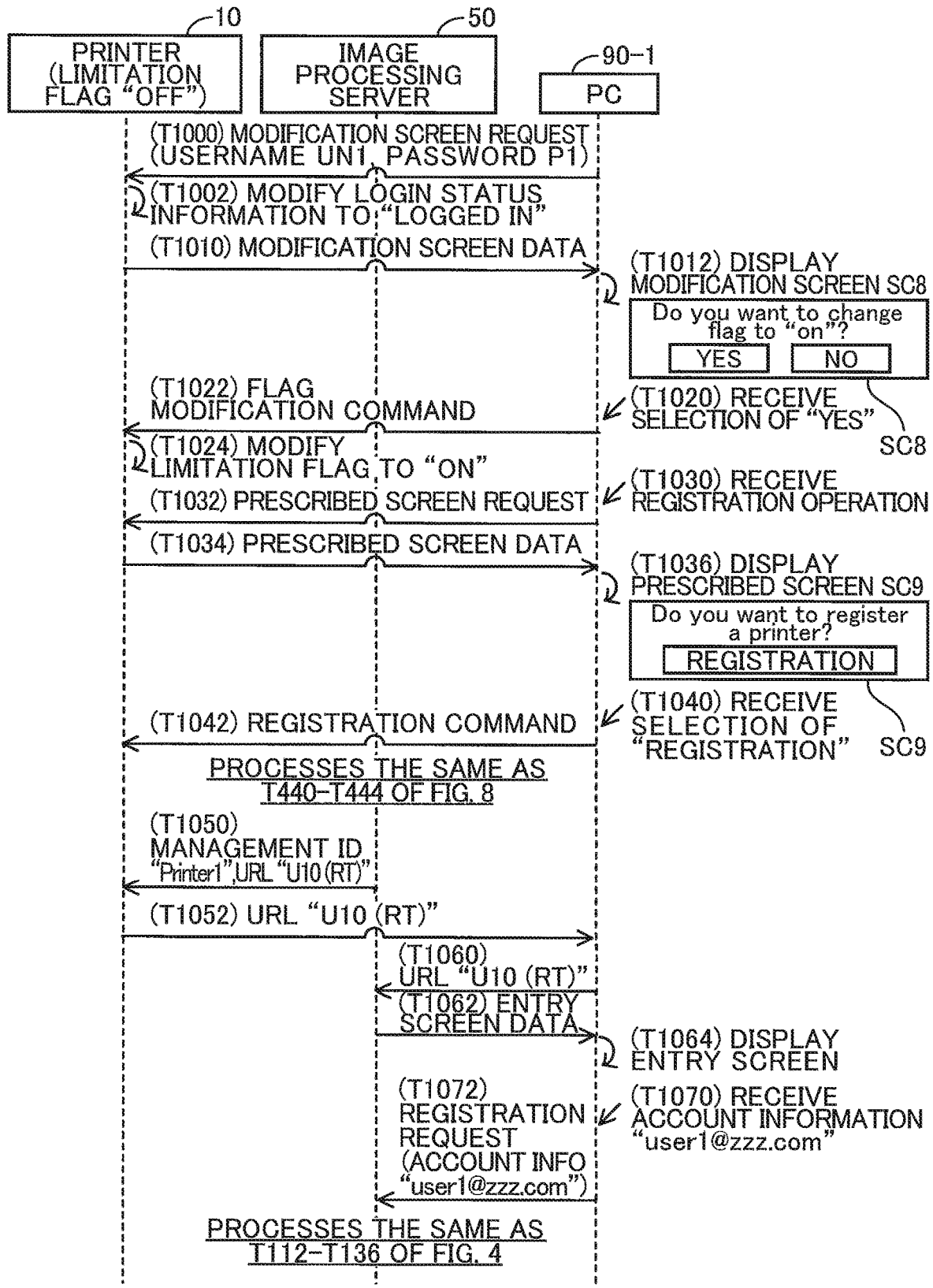
FIG. 14 is a sequence diagram illustrating a registration process according to a second embodiment.

When the PC 90-1 receives a command from the first user to modify the limitation flag 40 from "OFF" to "ON" in the printer 10, in T1000 of FIG. 14 the PC 90-1 transmits a modification screen request to the printer 10 requesting a modification screen for changing the limitation flag 40. The modification screen request includes the username UN1 and the password P1.

When the printer 10 receives the modification screen request from the PC 90-1 in T1000, in T1002 the printer 10 changes the login status information in the table 38 associated with the username UN1 included in the modification screen request from "logged out" to "logged in." In T1010 the printer 10 transmits modification screen data representing a modification screen SC8 to the PC 90-1.

After the PC 90-1 receives the modification screen data from the printer 10 in T1010, in T1012 the PC 90-1 displays the modification screen SC8 represented by the modification screen data. The modification screen SC8 includes a YES button for changing the limitation flag 40 to "ON", and a NO button for not changing the limitation flag 40.

In T1020 the PC 90-1 receives a selection for the YES button in the modification screen SC8 from the first user, and in T1022 transmits a flag modification command to the printer 10. The flag modification command instructs the printer 10 to change the limitation flag 40 from "OFF" to "ON".

When the printer 10 receives the flag modification command from the PC 90-1 in T1022, in T1024 the printer 10 modifies the limitation flag 40 in the memory 34 from "OFF" to "ON".

In T1030 the PC 90-1 receives a registration operation from the first user for registering the printer 10 on the server 50. In response, in T1032 the PC 90-1 transmits a prescribed screen request to the printer 10 requesting the printer 10 to transmit a prescribed screen. In the second embodiment, the first user does not log in to the server 50.

Upon receiving this prescribed screen request from the PC 90-1 in T1032, in T1034 the printer 10 transmits prescribed screen data representing a prescribed screen SC9 to the PC 90-1. The prescribed screen SC9 includes a Register button.

After receiving the prescribed screen data from the printer 10 in T1034, in T1036 the PC 90-1 displays the prescribed screen SC9 represented by the prescribed screen data. When the first user selects the Register button in the prescribed screen SC9 in T1040, in T1042 the PC 90-1 transmits a registration command to the printer 10. The registration command does not include the account information "user1@zzz.com" for the first user. Thereafter, the same process described in T440-T444 of FIG. 8 is executed.

In T1050 the server 50 transmits the management ID "Printer1" and a URL "U10" to the printer 10. The URL "U10" is location information specifying a location on the server 50 and includes the registration token RT as a query string.

When the printer 10 receives the management ID "Printer1" and the URL "U10" from the server 50 in T1050, in T1052 the printer 10 transmits the URL "U10" to the PC 90-1.

After receiving the URL "U10" from the printer 10 in T1052, in T1060 the PC 90-1 transmits the URL "U10" to the server 50 to access the server 50.

When the server 50 receives the URL "U10" from the PC 90-1 in T1060, the server 50 determines whether the registration token RT included in the URL "U10" matches the registration token RT included in the device information (see T44 of FIG. 3). Since the registration tokens match in this case, in T1062 the server 50 transmits entry screen data to the PC 90-1 representing an entry screen for inputting account information.

Upon receiving the entry screen data from the server 50 in T1062, in T1064 the PC 90-1 displays the entry screen. When the PC 90-1 receives input of the account information "user1@zzz.com" via the entry screen from the first user in T1070, in T1072 the PC 90-1 transmits a registration request to the server 50 that includes the account information "user1@zzz.com". Thereafter, the same process described in T112-T136 of FIG. 4 is executed, thereby completing the process for registering the printer 10 on the server 50.

Effects of the Second Embodiment

According to the second embodiment described above, the PC 90-1 transmits the registration command to the printer 10 after the first user performs the registration operation and selects the Register button on the PC 90-1. With this method, the PC 90-1 need not search for the printer 10, and the first user need not select the device name DN of the printer 10 from among a plurality of device names displayed in the search results, thereby improving user-friendliness.

While the invention has been described in detail with reference to specific embodiments thereof, it would be apparent to those skilled in the art that many modifications and variations may be made therein without departing from the scope of the invention, the scope of which is defined by the attached claims.

First Variation

In the embodiments, the limitation information in the table 38 specifies one or more print setting combinations that are allowed to the corresponding user, but the limitation information may instead specify one or more print setting combinations that are not allowed to the corresponding user. In this case, limitation information for the third user, for example, would include the single setting "color" for color settings and the single setting "simplex" for printer-sides settings. In T742 of FIG. 11, the printer 10 would use this limitation information to identify the single print setting combination (i.e., monochrome and duplex) that the third user is permitted to use and would store this print setting combination. Hence, the limitation information (example of the setting specification information) may be information for identifying one or more image process setting combinations that the corresponding user is permitted to use.

Second Variation

The table 38 may be stored on an external server rather than the printer 10. In this variation, in T735 of FIG. 11 the printer 10 transmits the account information "user3@zzz.com" included in the print command to the external server. When the external server receives the account information "user3@zzz.com" from the printer 10, the external server identifies the limitation information associated with the account information (i.e., "monochrome" and "duplex") and transmits this limitation information to the printer 10. In this way, the printer 10 can acquire the limitation information corresponding to the third user. In other words, the "memory" may be provided in a device separate from the image processing apparatus.

Third Variation

The limitation flag 40 may be set to "ON" at all times. In this variation, the transmitting the normal registration request in T40 of FIG. 3 (the second registration request transmitting step), the receiving the print command in T334 of FIG. 7 (the second command receiving step), and the executing the printing operation in T360 of FIG. 7 (the second image process controlling to execute the image process in accordance with the second setting step) may be omitted.

Fourth Variation

In the embodiments, the printer 10 transmits the normal registration request to the server 50 while the limitation flag 40 in the memory 34 is set to "OFF", and transmits the specific registration request to the server 50 while the limitation flag 40 is set to "ON". In a fourth variation, the printer 10 may transmit the normal registration request to the server 50 when the limitation information is not stored in the memory 34 and may transmit the specific registration request to the server 50 when the limitation information is stored in the memory 34. In this variation, a state where the limitation information is stored in the memory 34 is an example of the first mode, and a state where the limitation information is not stored in the memory 34 is an example of the second mode.

Fifth Variation

In T334 of FIG. 7, the printer 10 may receive from the server 50 a print command that includes the print data PD1 and the print settings (color and simplex) rather than the URLs "U1" and "U2", for example. In this variation, the print settings are examples of the relation information.

Sixth Variation

In a case where the printer 10 receives the print command from the server 50 in T834 of FIG. 12, the printer 10 may execute the process in T850 and T852 prior to executing the process in T835-T842. In other words, the receiving image data step (T852, T952) may receive image data from the server prior to the user specifying printing settings (T840, T940) (first image process settings) in the specification screen.

Seventh Variation

In T820 of FIG. 12, the printer 10 may transmit to the server 50 a job list request that further includes the account information "user1@zzz.com" associated with the username UN1 and the password P1 in the table 38. In this case, upon receiving the job list request from the printer 10, the server 50 identifies the print job J2 that includes this account information "user1@zzz.com", and transmits the job list data to the printer 10. The job list data received in T824 includes only information correlating the job ID "Job2" included in the print job J2 with the account information "user1@zzz.com". Upon receiving the job list data from the server 50, the printer 10 displays the job list represented by the job list data on the display 14.

Eighth Variation

The image processing apparatus is not limited to the printer 10, but may be any apparatus (a multifunction peripheral, for example) that can execute processes in addition to a printing process (a scanning process, for example). Alternatively, the image processing apparatus may be a scanner that can only execute scanning processes. In the latter case, the server 50 may mediate scanning operations between the scanner and the PCs 90-1 and the like. For example, in T440 of FIG. 8 the scanner transmits a specific registration request to the server 50 that includes specific function information indicating that none of the plurality of scan settings (or scan setting combinations) can be specified. As a result, the specification screen displayed in T516 of FIG. 9 does not include any buttons for specifying scan settings. Upon receiving a scan request including a scan setting indicating that settings are unspecified (i.e., NULL) from the PC 90-1 in T522, the server 50 transmits a scan command to the scanner that includes the account information "user1@zzz.com" in place of the process in T530-T534 of FIG. 9 described in the embodiments. As a result, the scanner acquires limitation information from the table 38 for the first user associated with the account information "user1@zzz.com" and displays a specification screen for specifying scan settings indicated by the limitation information. When the scanner receives specifications from the first user for scan settings in the specification screen, the scanner executes the scanning operation based on the scan settings and transmits the resulting scan data to the server 50. In this case, the server 50 transmits the scan data to the PC 90-1. The scanner may display the specification screen for specifying scan settings and execute scanning operation based on the specified scan settings via the specification screen only if the first user is logged in to the scanner. In this variation, the scan operation and the scan settings are respectively examples of the image process and the image process setting.

Ninth Variation

In the embodiments, each of the processes in FIGS. 2 through 14 are implemented in software (i.e., the program 36), but one or more of these processes may be implemented in hardware configured of logic circuits and the like.

Tenth Variation

At the beginning of the registration process in Case A shown in FIG. 3, the limitation flag may be set to OFF. In this case, similarly to T400 and T402 shown in FIG. 8, the limitation flag is modified to ON from OFF on the basis of a flag modification operation from the first user, for example. Subsequently, the steps beginning from T10 is executed as shown in FIG. 3.

Eleventh Variation

In the embodiment, if the current user is not logged in to the printer 10 and the current user is permitted use of only one print setting combination, the printer 10 perform printing by using the permitted print setting combination on the basis of the print job. However, in a case where the current user is not logged in to the printer 10, the printer 10 may discard the job list data and not perform printing even if current user is permitted use of only one print setting combination. In this case, if the current user is logged in to the printer 10, the printer 10 performs the processes the same as those T820-T872 to perform printing. In this case, the specification screen shown in the process corresponding to T836 may include settings (corresponding to one setting combination) permitted for the current user, and the current user may specify the permitted setting by using the specification screen.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

What is claimed is:

1. An image processing apparatus comprising:
   a display; and
   a processor configured to perform:
   receiving a registration instruction for registering information on the image processing apparatus to an external server;
   in response to receiving the registration instruction, transmitting to the external server a first registration request including incapability information, the incapability information indicating that any of a plurality of settings for an image process is incapable of being designated, the first registration request triggering the external server to register the incapability information and account information for a specific user of the image processing apparatus so that the incapability information and the account information are correlated with each other, wherein in a case where the external server receives the account information from a terminal device after the external server registers the incapability information and the account information, the external server transmits to the terminal device first selection screen data, the first selection screen data being generated on the basis of the incapability information correlated with the account information so that the first selection screen data represents a first selection screen including an operation specification area and excluding a setting specification area, the operation specification area being for receiving from a user of the terminal device a specification operation to instruct the image processing apparatus to perform the image process, the setting specification area being for receiving from the user of the terminal device an operation to set a setting for the image process;
   after the operation specification area in the first selection screen is specified in the terminal device and the terminal device transmits to the external server a first function execution request excluding a setting for the image process, receiving from the external server a first function execution instruction including the account information, and first relation information which is related to no setting for the image process being specified;
   acquiring, from a memory, setting specification information correlated with the account information, wherein the memory is configured to store, for each of one or more users including the specific user, account information and the setting specification information so that the account information and the setting specification information is correlated with each other, each setting specification information being for specifying one or more settings for the image process that the corresponding user is permitted to use;
   displaying on the display a specification screen for prompting the specific user to specify one setting from among one or more settings for the image process specified by the acquired setting specification information; and
   in a case where the specific user specifies a first setting for the image process via the specification screen, controlling the image processing apparatus to execute the image process in accordance with the first setting.

2. The image processing apparatus according to claim 1, wherein the processor is configured to further perform:
   changing a current mode between a first mode in which the specific information is used and a second mode in which the specific information is not used, wherein the first registration request is transmitted to the external server in a case where the current mode is the first mode,
   in response to receiving the registration instruction in a case where the current mode is the second mode, transmitting to the external server a second registration request including capability information, the capability information indicating that each of the plurality of settings is capable of being designated, the second registration request triggering the external server to register the capability information and the account information for the specific user so that the capability information and the account information are correlated with each other, wherein in a case where the external server receives the account information from the terminal device after the external server registers the capability information and the account information, the external server transmits to the terminal device second selection screen data, the second selection screen data being generated on the basis of the capability information correlated with the account information so that the second selection screen data represents a second selection screen including an operation specification area and a setting specification area, the operation specification area being for receiving from the user of the terminal device a specification operation to instruct the image processing apparatus to perform the image process, the setting specification area being for receiving from the user of the terminal device an operation to set a setting for the image process from among the plurality of settings;

after a second setting is selected from among the plurality of settings for the image process by using the setting specification area in the second selection screen in the terminal device, the operation specification area in the second selection screen is specified in the terminal device, and the terminal device transmits to the external server a second function execution request including the second setting for the image process, receiving from the external server a second function execution instruction including the account information, and second relation information which is related to the second setting being selected; and controlling the image processing apparatus to execute the image process in accordance with the second setting without displaying the specification screen.

3. The image processing apparatus according to claim 2, wherein the first relation information is a first URL designating a location of first information stored in the external server, the first information indicating that no setting for the image process is specified, wherein the second information is a second URL designating a location of second information stored in the external server, the second information specifying the second setting, wherein in a case where the first function execution instruction is received while the current mode is the first mode, the processor does not acquire the first information from the external server, wherein in a case where the second function execution instruction is received while the current mode is the second mode, the processor acquires the second information from the external server by using the second URL, and controls the image processing apparatus to execute the image process in accordance with the second setting indicated by the received second information.

4. The image processing apparatus according to claim 1, wherein in a case where the setting specification information specifies two or more settings for the image process, the specification screen prompts the specific user to specify one setting from among the two or more settings for the image process specified by the setting specification information, wherein in a case where the setting specification information specifies only one setting for the image process, the displaying a specification screen is not performed, and the processor controls the image processing apparatus to execute the image process in accordance with the only one setting for the image process.

5. The image processing apparatus according to claim 1, wherein the plurality of settings includes at least two first specific setting options for a first setting item and at least two second specific setting options for a second setting item so that at least four setting combinations are available, wherein in a case where settings specification information specifies the at least two first specific setting options for the first setting item and the at least two second specific setting options for the second setting item, the specification screen includes a first specification area for prompting the specific user to specify one of the at least two first specific setting options and a second specification area for prompting the specific user to specify one of the at least two second specific setting options, wherein in a case where settings specification information specifies only one first specific setting option for the first setting item and the at least two second specific setting options for the second setting item, the specification screen includes the second specification area while excluding the first specification area.

6. The image processing apparatus according to claim 1, wherein the processor is configured to further perform receiving user identification information for identifying the specific user, wherein after the receiving a first function execution instruction is performed and after the receiving user identification information is performed, the displaying a specification screen is performed, wherein after the receiving a first function execution instruction is performed and before the receiving user identification information is performed, the displaying a specification screen is not performed.

7. The image processing apparatus according to claim 1, wherein the image process includes a printing process, wherein the processor is configured to further perform receiving image data representing an image to be printed, wherein in a case where the specific user specifies the first setting for the image process via the specification screen and the image data is received, the controlling controls the image processing apparatus to execute the printing process on the image data in accordance with the first setting.

8. The image processing apparatus according to claim 7, wherein the receiving the image data is performed after the specific user specifies the first setting for the image process via the specification screen.

9. The image processing apparatus according to claim 1, further comprising a memory.

10. The image processing apparatus according to claim 1, further including a print execution unit configured to perform printing and wherein the image process includes a printing operation.

11. A non-transitory computer readable storage medium storing a set of program instructions for an image processing apparatus including a display, the set of program instructions comprising:

receiving a registration instruction for registering information on the image processing apparatus to an external server;

in response to receiving the registration instruction, transmitting to the external server a first registration request including incapability information, the incapability information indicating that any of a plurality of settings for an image process is incapable of being designated, the first registration request triggering the external server to register the incapability information and account information for a specific user of the image processing apparatus so that the incapability information and the account information are correlated with each other, wherein in a case where the external server receives the account information from a terminal device after the external server registers the incapability information and the account information, the external server transmits to the terminal device first selection screen data, the first selection screen data being generated on the basis of the incapability information correlated with the account information so that the first selection screen data represents a first selection screen including an operation specification area and excluding a setting specification area, the operation specification area being for receiving from a user of the terminal device a specification operation to instruct the image processing apparatus to perform the image process, the setting specification area being for receiving from the user of the terminal device an operation to set a setting for the image process;

after the operation specification area in the first selection screen is specified in the terminal device and the terminal device transmits to the external server a first function execution request excluding a setting for the image process, receiving from the external server a first function execution instruction including the account information, and first relation information which is related to no setting for the image process being specified;

acquiring, from a memory, setting specification information correlated with the account information, wherein the memory is configured to store, for each of one or more users including the specific user, account information and the setting specification information so that the account information and the setting specification information is correlated with each other, each setting specification information being for specifying one or more settings for the image process that the corresponding user is permitted to use;

displaying on the display a specification screen for prompting the specific user to specify one setting from among one or more settings for the image process specified by the acquired setting specification information; and in a case where the specific user specifies a first setting for the image process via the specification screen, controlling the image processing apparatus to execute the image process in accordance with the first setting.

* * * * *